US011176726B2

(12) United States Patent
Tobin

(10) Patent No.: US 11,176,726 B2
(45) Date of Patent: Nov. 16, 2021

(54) TECHNIQUES FOR DISPLAYING AN ANIMATED CALLING CARD

(71) Applicant: eBay Inc., San Jose, CA (US)

(72) Inventor: John Patrick Edgar Tobin, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/568,339

(22) Filed: Sep. 12, 2019

(65) Prior Publication Data
US 2020/0005512 A1 Jan. 2, 2020

Related U.S. Application Data

(63) Continuation of application No. 15/282,958, filed on Sep. 30, 2016, now Pat. No. 10,445,919, which is a continuation of application No. 13/854,570, filed on Apr. 1, 2013, now Pat. No. 9,472,013.

(51) Int. Cl.
G06T 13/80 (2011.01)
H04M 3/42 (2006.01)
G06F 3/0488 (2013.01)
G06F 3/0481 (2013.01)

(52) U.S. Cl.
CPC .......... *G06T 13/80* (2013.01); *G06F 3/0488* (2013.01); *H04M 3/42042* (2013.01); *G06F 3/04812* (2013.01); *G06T 2200/24* (2013.01); *G06T 2213/12* (2013.01); *H04M 2201/38* (2013.01)

(58) Field of Classification Search
CPC ................................. G06T 13/80
USPC .......................................... 345/473
See application file for complete search history.

(56) References Cited

U.S. PATENT DOCUMENTS

| 7,808,450 | B2 | 10/2010 | Wanda et al. | |
| 8,374,628 | B1* | 2/2013 | Nelissen | H04M 3/436 455/456.1 |
| 8,644,847 | B1 | 2/2014 | Nelissen et al. | |
| 9,472,013 | B2 | 10/2016 | Tobin | |
| 10,445,919 | B2 | 10/2019 | Tobin | |
| 2004/0109551 | A1* | 6/2004 | Simpson | H04M 3/4281 379/215.01 |
| 2008/0184133 | A1 | 7/2008 | Lee et al. | |
| 2009/0005018 | A1 | 1/2009 | Forstall et al. | |

(Continued)

OTHER PUBLICATIONS

Applicant Initiated Interview Summary received for U.S. Appl. No. 13/854,570, dated Apr. 27, 2016, 3 pages.

(Continued)

*Primary Examiner* — Shivang I Patel
(74) *Attorney, Agent, or Firm* — Schwegman Lundberg & Woessner, P.A.

(57) ABSTRACT

According to various exemplary embodiments, a communication request from a caller is received at a mobile device associated with a callee. A relationship between the caller and the callee is determined. Animation rule information is accessed, where the animation rule information describes a plurality of animation rules corresponding to a plurality of relationships. Thereafter, a display of an animation is generated via a user interface in the mobile device of the callee, based on a specific animation rule in the animation rule information that corresponds to the relationship between the caller and the callee.

20 Claims, 25 Drawing Sheets

(56) References Cited

U.S. PATENT DOCUMENTS

| | | | |
|---|---|---|---|
| 2009/0197621 A1* | 8/2009 | Book | H04M 1/575 |
| | | | 455/457 |
| 2009/0254840 A1 | 10/2009 | Churchill et al. | |
| 2010/0302254 A1* | 12/2010 | Min | G06T 13/80 |
| | | | 345/473 |
| 2011/0003665 A1 | 1/2011 | Burton et al. | |
| 2013/0141513 A1 | 6/2013 | Setton et al. | |
| 2014/0092130 A1 | 4/2014 | Anderson et al. | |
| 2014/0292768 A1 | 10/2014 | Tobin | |
| 2015/0106784 A1 | 4/2015 | Tzubary et al. | |
| 2017/0024923 A1 | 1/2017 | Tobin | |

OTHER PUBLICATIONS

Applicant Initiated Interview Summary received for U.S. Appl. No. 13/854,570, dated Dec. 2, 2015, 3 pages.
Applicant Initiated Interview Summary received for U.S. Appl. No. 13/854,570, dated Jul. 23, 2015, 4 pages.
Applicant Initiated Interview Summary received for U.S. Appl. No. 13/854,570, dated Nov. 19, 2014, 4 pages.
Final Office Action received for U.S. Appl. No. 13/854,570, dated Jan. 12, 2016, 26 pages.
Final Office Action received for U.S. Appl. No. 13/854,570, dated Mar. 25, 2015, 24 pages.
Non-Final Office Action received for U.S. Appl. No. 13/854,570, dated Mar. 11, 2016, 26 pages.
Non-Final Office Action received for U.S. Appl. No. 13/854,570, dated Sep. 4, 2015, 21 pages.
Non-Final Office Action received for U.S. Appl. No. 13/854,570, dated Sep. 25, 2014, 20 pages.
Notice Of Allowance received for U.S. Appl. No. 13/854,570, dated Jun. 22, 2016, 8 pages.
Response to Final Office Action filed on Feb. 10, 2016, for U.S. Appl. No. 13/854,570, dated Jan. 12, 2016, 10 pages.
Response to Final Office Action filed on Jul. 27, 2015, for U.S. Appl. No. 13/854,570, dated Mar. 25, 2015, 10 pages.
Response to Non-Final Office Action filed on Apr. 26, 2016, for U.S. Appl. No. 13/854,570, dated Mar. 11, 2016, 11 pages.
Response to Non-Final Office Action filed on Dec. 4, 2015, for U.S. Appl. No. 13/854,570, dated Sep. 4, 2015, 9 pages.
Response to Non-Final Office Action filed on Dec. 23, 2014, for U.S. Appl. No. 13/854,570, dated Sep. 25, 2018, 13 pages.
Applicant Initiated Interview Summary received for U.S. Appl. No. 13/854,570, dated Feb. 10, 2016, 3 pages.
Advisory action received for U.S. Appl. No. 15/282,958, dated Apr. 29, 2019, 5 pages.
Applicant Initiated Interview Summary received for U.S. Appl. No. 15/282,958, dated Jan. 25, 2017, 3 pages.
Applicant Interview Summary received for U.S. Appl. No. 15/282,958, dated Mar. 20, 2019, 3 pages.
Corrected Notice of Allowability received for U.S. Appl. No. 15/282,958, dated Jul. 29, 2019, 2 pages.
Final Office Action received for U.S. Appl. No. 15/282,958, dated Feb. 7, 2019, 32 pages.
Final Office Action received for U.S. Appl. No. 15/282,958, dated May 25, 2017, 38 pages.
Non-Final Office Action received for U.S. Appl. No. 15/282,958, dated Jan. 4, 2018, 34 Pages.
Non-Final Office Action received for U.S. Appl. No. 15/282,958, dated Jul. 10, 2018, 38 pages.
Notice Of Allowance received for U.S. Appl. No. 15/282,958, dated Jun. 6, 2019, 8 pages.
Pre-Interview first office action received for U.S. Appl. No. 15/282,958, dated Feb. 14, 2017, 3 pages.
Pre-Interview first office action received for U.S. Appl. No. 15/282,958, dated Nov. 23, 2016, 5 pages.
Preliminary Amendment filed on Oct. 25, 2016, for U.S. Appl. No. 15/282,958, 8 pages.
Response to Pre-Interview first office action filed on Mar. 8, 2017, for U.S. Appl. No. 15/282,958, dated Feb. 14, 2017, 11 pages.
Response to Final Office Action filed on Apr. 8, 2019 for U.S. Appl. No. 15/282,958, dated Feb. 7, 2019, 12 pages.
Response to Final Office Action filed on Jul. 12, 2017, for U.S. Appl. No. 15/282,958, dated May 25, 2017, 10 pages.
Response to Non-Final Office Action filed on Apr. 2, 2018, for U.S. Appl. No. 15/282,958, dated Jan. 4, 2018, 13 pages.
Response to Non-Final Office Action filed on Oct. 23, 2018, for U.S. Appl. No. 15/282,958, dated Jul. 10, 2018, 14 pages.
Response to Pre-Interview first office action filed on Dec. 17, 2016, for U.S. Appl. No. 15/282,958, dated Nov. 23, 2016, 7 pages.
Response to Pre-Interview first office action filed on Jan. 19, 2017, for U.S. Appl. No. 15/282,958, dated Nov. 23, 2016, 11 pages.

* cited by examiner

| RELATIONSHIP | ANIMATION RULE |
|---|---|
| Romantic | Animation Rule 1 |
| Business | Animation Rule 2 |
| Friend | Animation Rule 3 |
| Family | Animation Rule 4 |
| Spam | Animation Rule 5 |
| ... | ... |
| ... | ... |
| ... | ... |

TECHNIQUES FOR DISPLAYING AN ANIMATED CALLING CARD

RELATED APPLICATIONS

This application is a continuation of U.S. patent application Ser. No. 15/282,958, filed Sep. 30, 2016, which is a continuation of U.S. patent application Ser. No. 13/854,570, filed on Apr. 1, 2013, which application is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FILED

The present application relates generally to electronic communications and, in one specific example, to techniques for displaying an animated electronic calling card.

BACKGROUND

The use of mobile phones (including smartphones) has increased rapidly in recent years. Conventionally, when a user receives an incoming telephone call on their mobile phone, the user interface of the mobile phone will display a notification of the incoming call. Such a notification typically identifies the telephone number of the caller, and an identity of the caller, if known. Various conventional notifications may also include a static picture of the caller.

BRIEF DESCRIPTION OF THE DRAWINGS

Some embodiments are illustrated by way of example and not limitation in the figures of the accompanying drawings in which.

DETAILED DESCRIPTION

Example methods and systems for displaying an animated calling card are described. In the following description, for purposes of explanation, numerous specific details are set forth in order to provide a thorough understanding of example embodiments. It will be evident, however, to one skilled in the art that the present invention may be practiced without these specific details.

Figure 1:
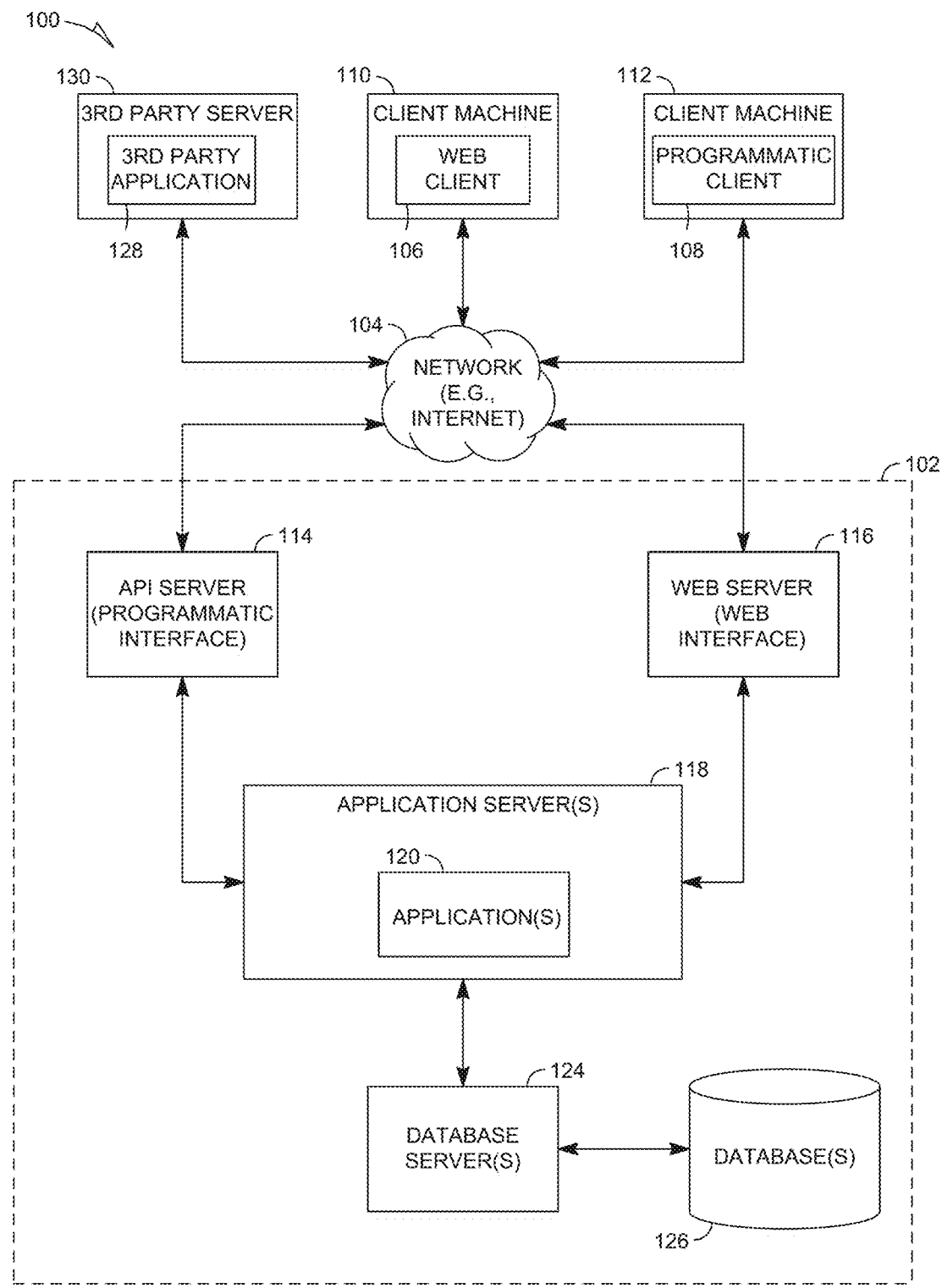
FIG. 1 is a network diagram depicting a client-server system, within which one example embodiment may be deployed.

FIG. 1 is a network diagram depicting a client-server system 100, within which one example embodiment may be deployed. A networked system 102 provides server-side functionality via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various exemplary embodiments, the applications 120 may correspond to one or more of the modules of the system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
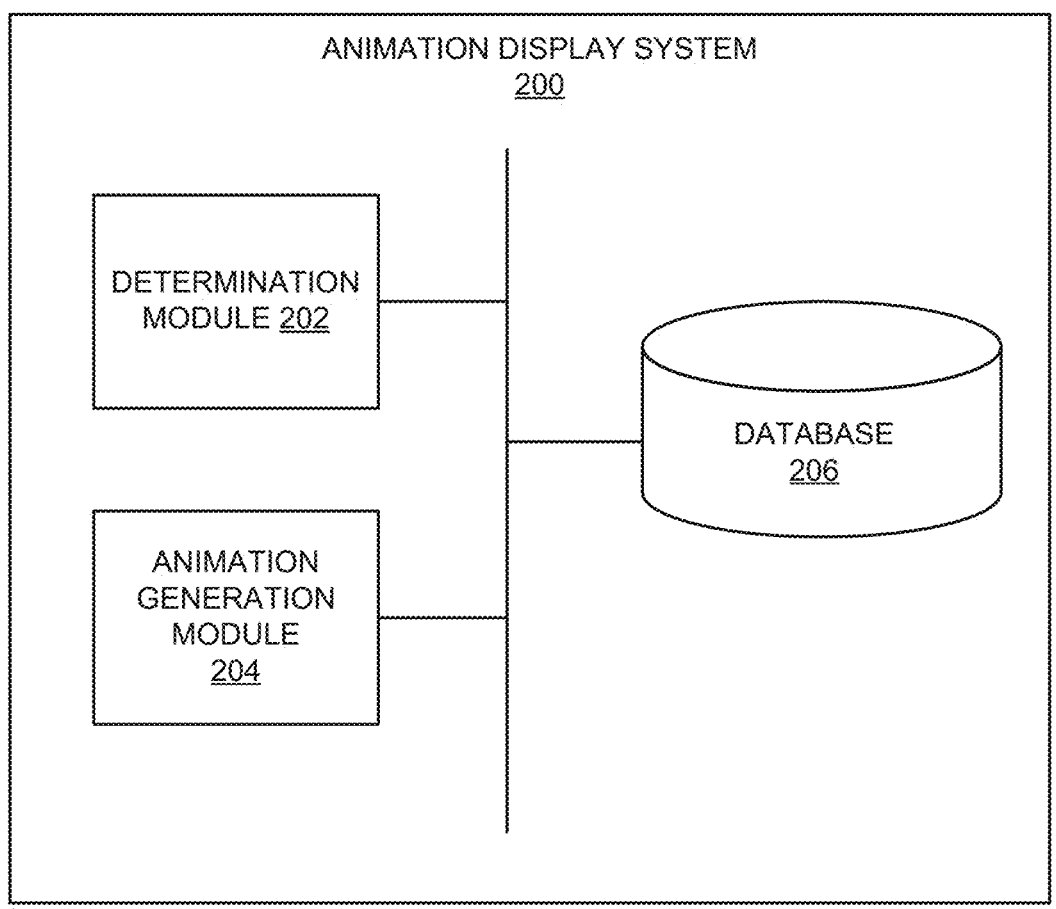
FIG. 2 is a block diagram of an example system, according to various embodiments.

Turning now to FIG. 2, an animation display system 200 includes a determination module 202, an animation generation module 204, and a database 206. The modules of the animation display system 200 may be implemented on a single device such as an animation display device, or on separate devices interconnected via a network. The aforementioned animation display device may correspond to, for example, one of the client machines (e.g. 110, 112) or application servers) 118 illustrated in FIG. 1.

According to various exemplary embodiments described herein, when a user receives an incoming telephone call on their mobile device (e.g., a mobile phone, a cell phone, a smartphone, a tablet device, etc.), the animation display system 200 will dynamically display a contextually relevant animation in the user interface of the mobile device. For example, the contextually relevant animation may reflect the relationship between a user placing the call (the "caller") and the user receiving the call (the "callee"). For example, if the caller and the callee have a romantic relationship, the animation display system 200 may generate a romance-related animation featuring a heart-shaped object. As another example, if the caller and the callee have a business relationship, the animation display system 200 may generate a business-related animation featuring an office environment, an office file cabinet, etc. Moreover, the contextually relevant animation may include media content related to the identities of the caller or callee, such as profile pictures, graphics, photographs, videos, company logos, etc. For example, if the caller and the callee have a romantic relationship, the animation display system 200 may generate an animation of the caller's profile picture and the callee's profile picture moving together over a heart-shaped background. As another example, if the caller and the callee have a business relationship, then the animation display system 200 may generate an animation of the caller at work in an office with a computer or file cabinet, with the company logo of the caller displayed on the wall of the office. Thus, in various exemplary embodiments, the contextually relevant animation may correspond to an animated electronic calling card that represents the identity of the caller or the callee, or a relationship between the caller and the callee. Numerous other examples will become apparent to those skilled in the art.

Thus, instead of a user being shown only the name or telephone number of a caller when they receive a telephone call from the caller, the animation display system 200 generates an informative, interesting, and entertaining animation for display on the user's mobile device. Such an animation provides the user with more information about the caller and the probable nature of the call, permitting the user to make a better decision about whether to answer the incoming call or how to otherwise handle the incoming call. The techniques described herein may encourage greater interaction between users and their mobile devices, and may ultimately promote greater communication between users.

Figure 3:
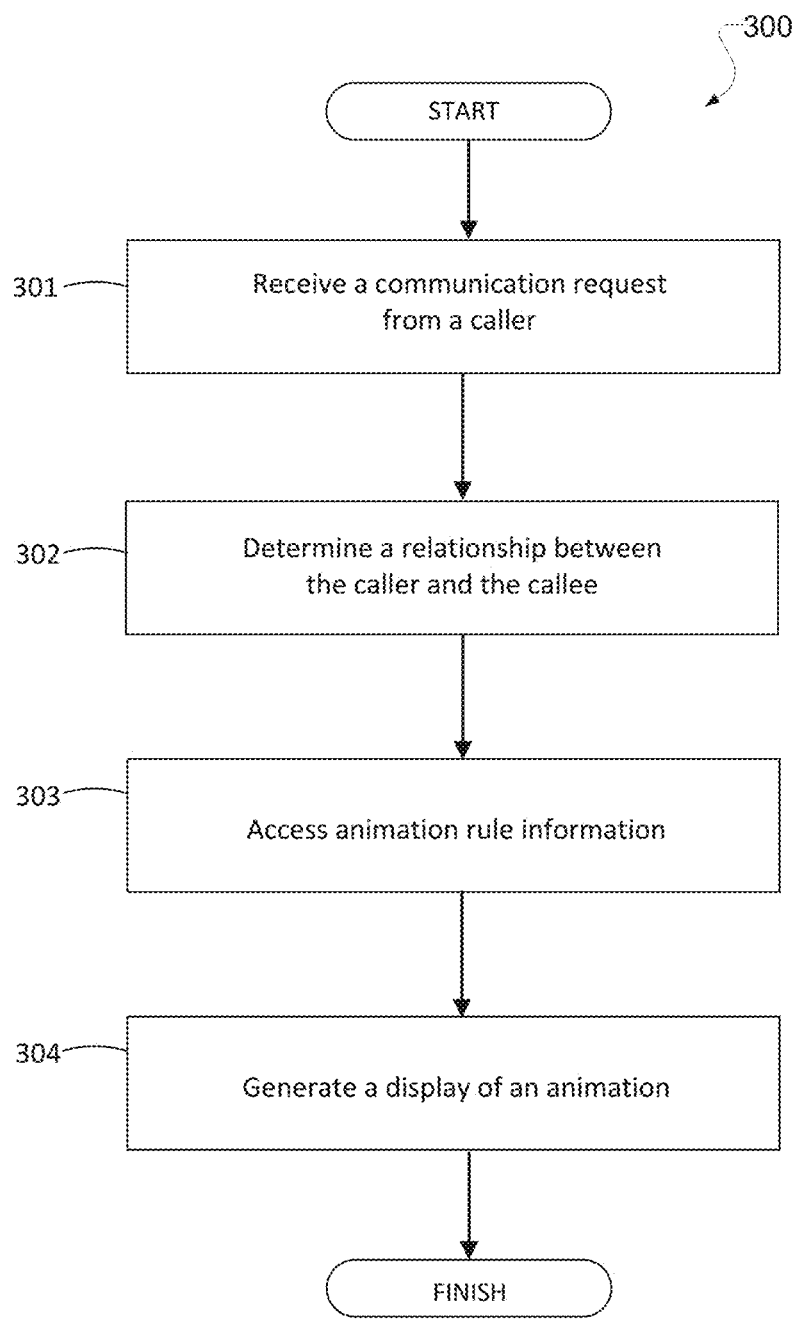
FIG. 3 is a flowchart illustrating an example method, according to various embodiments.

For example, FIG. 3 is a flowchart illustrating an example method 300, according to various embodiments. The method 300 may be performed at least in part by, for example, the animation display system 200 illustrated in FIG. 2 (or an apparatus having similar modules, such as client machines 110 and 112 or application server 112 illustrated in FIG. 1). In 301, the determination module 202 receives, at a mobile device associated with a first user (the "callee"), a communication request from a second user (the "caller"). In 302, the determination module 202 determines a relationship between the caller and the callee. For example, the determination module 202 may determine the relationship between the caller and the callee based on user directory information of the callee. In 303, the animation generation module 204 accesses animation rule information describing animation rules corresponding to various relationships. Finally, in 304, the animation generation module 204 generates a display of an animation, via a user interface in the first mobile device of the callee, based on a specific one of the animation rules in the animation rule information that corresponds to the relationship determined in 302. In other words, the animation generation module 204 generates a display of an animation corresponding to the relationship between the caller and the callee. Each of the aforementioned operations 301-304, and each of the aforementioned modules of the animation display system 200, will now be described in greater detail.

Referring back to FIG. 3, in 301, the determination module 202 receives, at a first mobile device associated with a callee, a communication request from a caller. According to an exemplary embodiment, the communication request may correspond to a conventional telephone call placed over a cellular or voice-over-IP (VOIP) network (wherein, for example, the caller specifies the telephone number of the callee via a telephonic device, thereby placing a call directed at callee). According to various other exemplary embodiments, the communication request may correspond to, for example, a text message (such as a short message service (SMS) text message, or a multimedia messaging service (MMS) text message), an instant message, an e-mail message, a video chat request, etc. The embodiments described herein are also applicable to other types of electronic communications or electronic communication requests understood by those skilled in the art.

In 302, the determination module 202 determines a relationship between the caller and the callee. For example, the relationship may be determined based on user directory information of the callee corresponding to an address book, contact list, directory of contacts, etc., which may be stored locally on the callee's mobile device. By way of example and not limitation, the user directory information may instead or in addition be stored remotely on a server, data repository, application, website, or software service that is accessible by the mobile device of the callee via a network (e.g., the Internet), although such storage on a remote server is optional. For example, according to various exemplary embodiments, the user directory information may be stored in connection with an e-mail application, social networking account, or professional networking account of the callee that is accessible by the determination module 202 via a network (e.g., the Internet).

Figure 4:
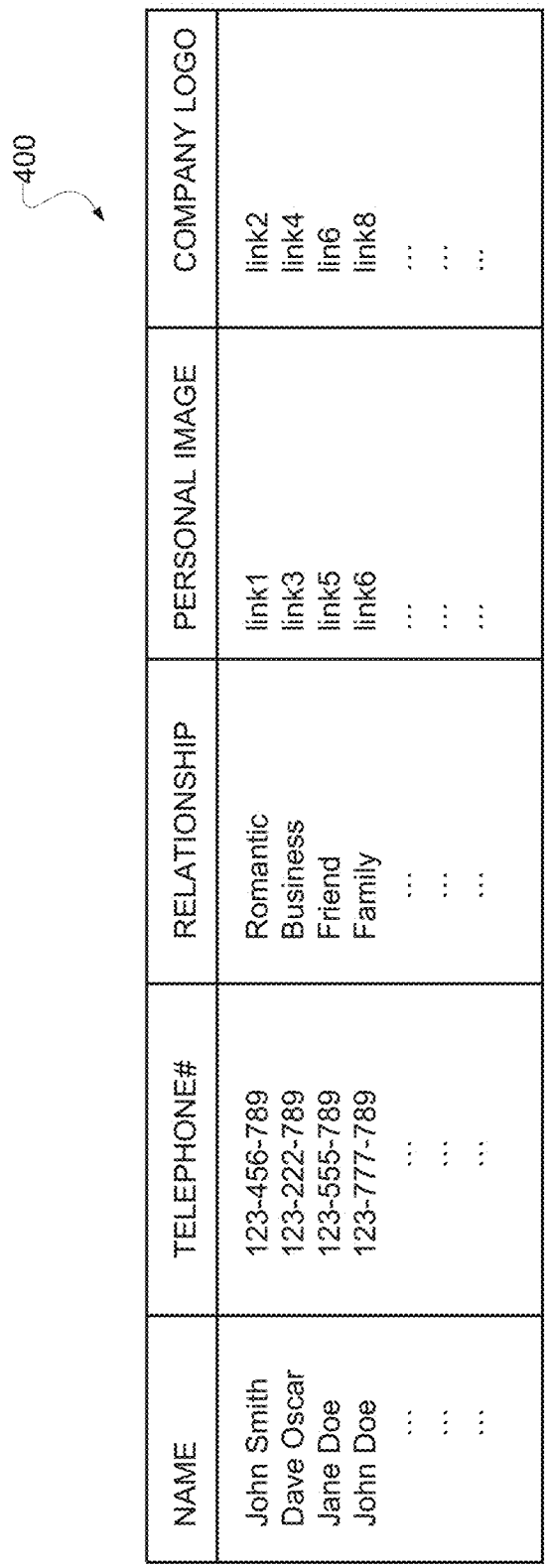
FIG. 4 illustrates an example of user directory information, according to various embodiments.

FIG. 4 illustrates an example of user directory information 400 of a particular user (e.g., a prospective callee "Janet Sample") that identifies multiple other users (e.g., friends, acquaintances, or colleagues) of the callee. The user directory information 400 may be stored at, for example, the database 205 illustrated in FIG. 2. In particular, the user directory information 400 identifies multiple users and, for each of the users, a name of the user, a telephone number of the user, and relationship data indicating a known relationship that the user has with the callee. Non-limiting examples of relationships include a romantic relationship (or, more specifically, husband, wife, partner, boyfriend, girlfriend, etc.), a family relationship (or, more specifically, father, mother grandfather, grandmother, son, daughter, brother, sister, uncle, nephew, niece, cousin, etc.), a friendship relationship, a business/work colleague relationship, a classmate relationship, an undefined relationship, and so on. As illustrated in FIG. 4, the user directory information 400 may also include other information such as a link to a personal image (e.g., a profile picture) and/or a link to a company logo associated with each user.

For example, as illustrated in FIG. 4, the user directory information 400 indicates that the user "John Smith" has the telephone number "123-456-789" and has a relationship of "Romantic" with the callee or owner of the user directory information 400, whereas the user "Dave Oscar" has the telephone number "123-222-789" and the relationship "Work Colleague" with the callee or owner of the user directory information 400. Thus, the determination module 202 may determine the relationship between the caller and the callee based on such relationship data included in the user directory information 400. For example, if the communication request received by the callee originated from the user John Smith, then the determination module 202 will determine that the corresponding relationship is the Romantic relationship, based on the user directory information 400. On the other hand, if the communication request received by the callee originated from the user Dave Oscar, then the determination module 202 will determine that the corresponding relationship is the Business relationship, based on the user directory information 400.

The relationship data identified in the user directory information 400 may be obtained or generated in various ways. For example, according to an exemplary embodiment, the relationship data may be generated by the determination module 202 based on user input (e.g., by a prospective callee that is the owner of the user directory information 400). According to another embodiment, the determination module 202 may infer a relationship (e.g., a family relationship) between a user and the prospective callee based on, for example, similarities in the last names of the user and the callee. For example, if the owner of the user directory information 400 is Janet Sample, the determination module 202 may determine that the relationship between a user John Sample and the prospective callee Janet Sample is a Family relationship, and the entry for the user John Sample in the user directory information of Janet Sample may indicate the Family relationship.

According to another exemplary embodiment, the relationship data may be obtained from an e-mail account of the callee. For example, the determination module 202 may be configured to access an e-mail account of the prospective callee and extract a contact list/directory and associated information from the e-mail account. The information accessible from the e-mail account may be used to infer the relationship between the prospective callee and the multiple other users. For example, if the content of e-mails between the callee Janet Sample and another user Barbara Sample includes the words "Dear Mom", then the determination module 202 may infer a Family relationship between the user Barbara Sample and the callee Janet Sample. Thus, the entry for the user Barbara Sample in the user directory information of Janet Sample will list a Family relationship.

According to another exemplary embodiment, the relationship data may be obtained from a social or professional networking account of the prospective callee. For example, the determination module 202 may be configured to access social or professional networking account of the callee that is hosted by a social or professional networking service/website such as LinkedIn.com or Facebook.com. Relationship data may be imported from such networking accounts, or the information accessible from such networking accounts may be used to infer the relationship between the prospective callee and multiple other users. For example, if the prospective callee's professional networking profile indicates that the prospective callee and the user Dave Oscar currently work at the same company, then the determination module 202 may determine that the relationship between Dave Oscar and the prospective callee is a Business relationship. As another example, if the callee's social networking profile indicates that the user Jane Doe is a contact, connection, or friend of the prospective callee, then a Friend relationship may be inferred by the determination module 202. As another example, if the prospective callee's social networking profile indicates that the user John Smith is "in a relationship" with the prospective callee, then a "romantic" relationship may be inferred by the determination module 202.

Figure 5:
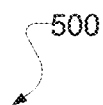
FIG. 5 illustrates an example of animation rule information, according to various exemplary embodiments.

Referring back to FIG. 3, after the determination module 202 determines a relationship between the caller and the callee (in 302), the animation generation module 204 accesses animation mile information describing animation rules corresponding to a various relationships (in 303). The animation rule information may be stored at, for example, the database 205 illustrated in FIG. 2. FIG. 5 illustrates an example of animation rule information 500 that identifies a number of relationships, such as a Romantic relationship, a Business relationship, a Friend relationship, a Family relationship, and so on. (Some of the relationships included in the animation rule information 500 may correspond to the relationships identified in the user directory information 400 illustrated in FIG. 4). The animation rule information 500 also identifies, for each of the aforementioned relationships, an animation rule. Each animation rule refers to any type of information (e.g., rules, instructions, algorithms, files, data, metadata, programming code, programming language, etc.) that specifies or defines a particular animation. For example, each animation rule may correspond to a link to a file containing code specifying an animation, such as a Graphics Interchange Format (GIF) animation, a Flash animation or Flash cartoon (which is created using Adobe Flash or similar animation software and often distributed in the ".swf" file format), or a 3D animation (which may be created with the use of Autodesk Maya, which is computer graphics software that is owned and developed by Autodesk, Inc). The embodiments of this disclosure are applicable to other types of animations created by other electronic applications in other electronic formats, as understood by those skilled in the art. As described in more detail below, each of the animation rules may specify an animation that is related to—or somehow reflective of—each corresponding relationship. For example, the animation rule corresponding to the Romantic relationship may specify a romance-related animation (e.g., an animation of a heart, flowers, chocolates, candles, etc.), while the animation rule corresponding to the Business relationship may specify a work-related animation (e.g., an animation set in an office environment including a computer, desk, office file cabinet, etc.).

Referring back to FIG. 3, after the animation generation module 204 accesses the animation rule information (in 303), the animation generation module 204 may identify a specific one of the animation rules in the animation rule information that corresponds to the relationship determined in 302. For example, if the determination module 202 determined that the relationship between the caller and the callee is a Romantic relationship, then the animation generation module 204 would access animation rule 1 corresponding to the romantic relationship (see FIG. 5). As another example, if the determination module 202 determined that the relationship between the caller and the callee is a Business relationship, then the animation generation module 204 would access animation rule 2 corresponding to the Business relationship (see FIG. 5).

Finally, in 304 in FIG. 3, the animation generation module 204 generates a display of an animation via a user interface in the callee's mobile device. The animation generation module 204 may generate the animation based on the specific animation rule in the animation rule information (that was accessed in 303) that corresponds to the relationship between the caller and the callee (that was determined in 302). In other words, the animation generation module 204 may generate an animation that is related to or in some way reflective of the relationship between the caller and the callee. The animation generation module 204 may display such an animation in a notification screen that notifies the callee of the incoming call from the caller (that was received in 301).

Figure 6:
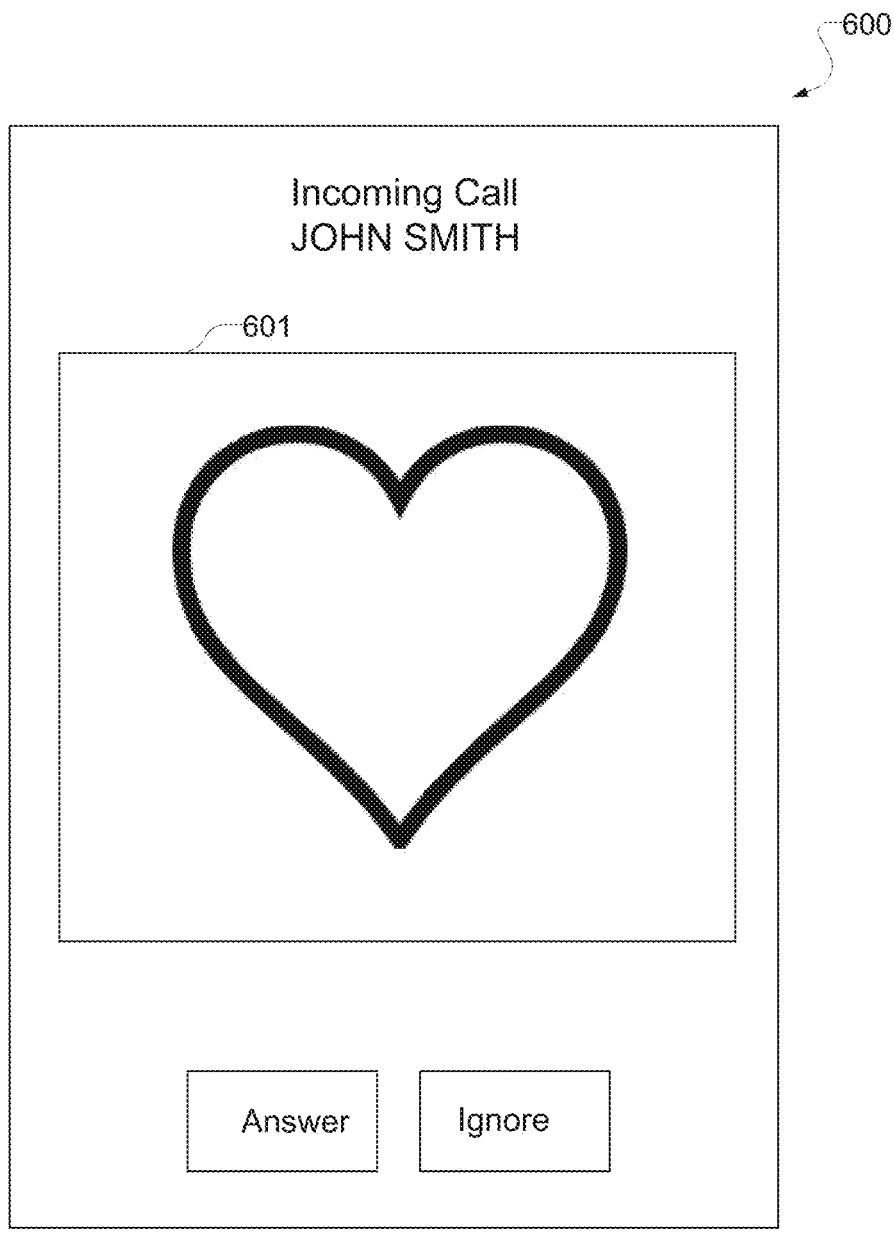
FIG. 6 illustrates an exemplary portion of a user interface displaying a notification of an incoming call, according to various embodiments.

FIG. 6 illustrates an example of a notification 600 displayed in a user interface of a callee's mobile device, where notification 600 notifies the callee of an incoming call from the caller John Smith. For example, the animation generation module 204 may generate the animation 601 based on the specific animation rule in the animation rule information (see FIG. 5) that corresponds to a relationship between the caller and the callee (see FIG. 4). For example, if the determination module 202 determines that the relationship between the caller John Smith and the callee is a Romantic relationship (per the user directory information 400 illustrated in FIG. 4), then the animation generation module 204 may generate the animation based on corresponding animation rule 1 (per the animation rule information 500 illustrated in FIG. 5). As described above, the animation rule 1 corresponding to the Romantic relationship may specify a link to a file containing a romance-related animation 601 of a heart, for example, and the animation generation module 204 may access the animation file via the link specified in animation rule 1. Thus, since the caller John Smith has a romantic relationship with the callee, the animation display system 200 causes a romance-related animation 601 of a heart to be displayed in the notification 600. It is apparent to those skilled in the art that FIG. 6 depicts a single frame of the animation 601 in the interests of clarity, and the complete animation 601 of the heart-shaped object may include a sequence of frames that may depict, for example, changing colors in the heart-shaped object, movement in the heart-shaped object, and so on.

Figure 7:
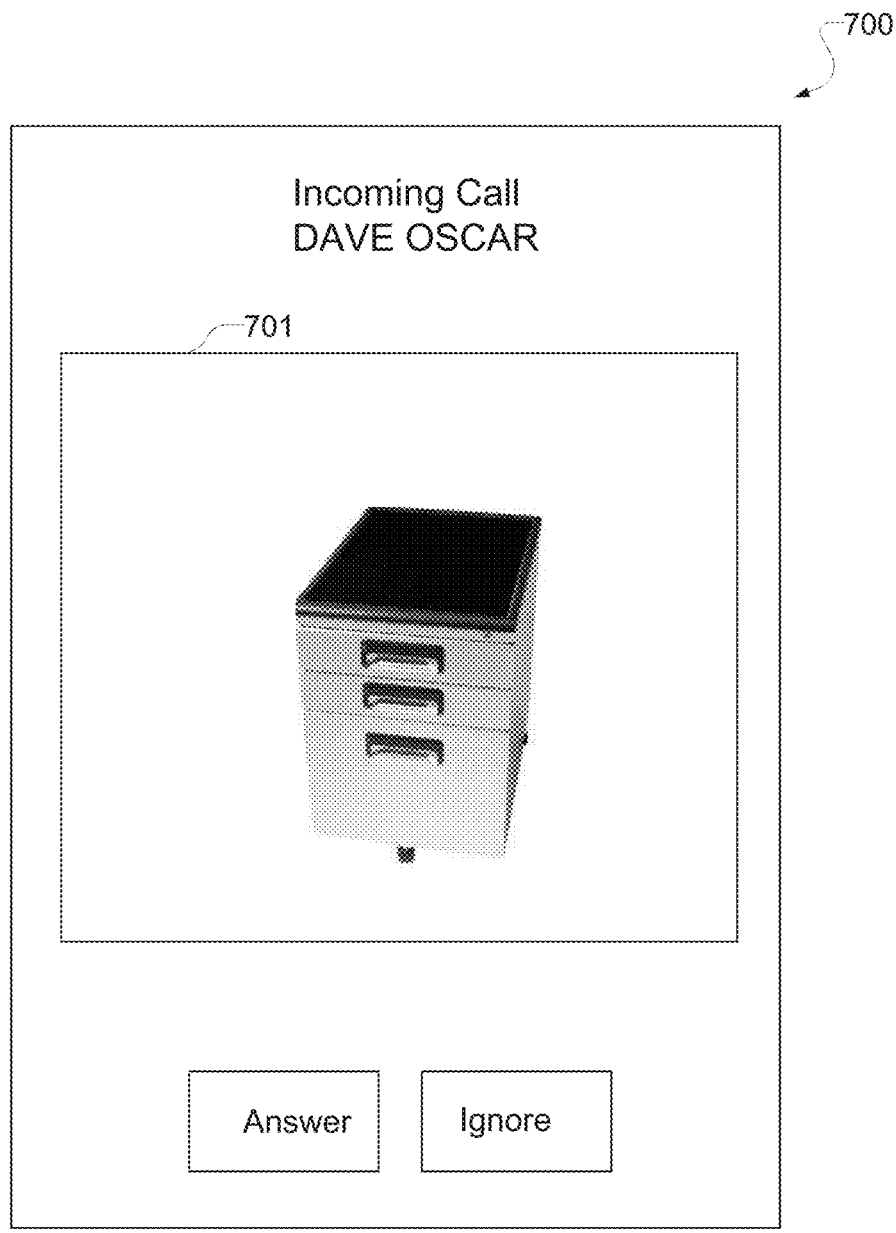
FIG. 7 illustrates an exemplary portion of a user interface displaying a notification of an incoming call, according to various embodiments.

FIG. 7 illustrates an example of another notification 700 displayed in a user interface of a callee's mobile device, where notification 700 notifies the callee of an incoming call from the caller Dave Oscar. If the determination module 202 determines that the relationship between the caller Dave Oscar and the callee is a business relationship (per the user directory information 400 illustrated in FIG. 4), then the animation generation module 204 may generate the animation based on corresponding animation rule 2 (per the animation rule information 500 illustrated in FIG. 5). For example, the animation rule 2 corresponding to the business relationship may specify a link to a file containing a business-related animation 701 of an office file cabinet, and the animation generation module 204 may access the animation file via the link specified in the animation rule 2. Thus, since the caller Dave Oscar has a business relationship with the callee, the animation display system 200 causes a business related animation 701 of an office file cabinet to be displayed in the notification 700. It is apparent to those skilled in the art that FIG. 7 depicts a single frame of the animation 701 in the interests of clarity, and the complete animation 701 may include a sequence of frames that may depict, for example, movement of the file cabinet, papers being inserted or removed from the file cabinet, and so on.

It is apparent that various operations may be performed partially or wholly at a mobile device or at a server. For example, the determination module 202 and/or animation generation module 204 may be implemented by one or more processors on a callee's mobile device, or a server in communication with the callee's mobile device (e.g., the servers 118 illustrated in FIG. 1). Further, user directory information and/or animation rules may be stored on the callee's mobile device, or at a server (e.g., the callee's mobile device may sync with the server in order to access such user directory information or animation rules). Thus, according to an exemplary embodiment, the animation rules may be stored on a server, and animation may be generated by the server (instead or in addition to the callee's phone), and the server may transmit the animation to the callee's phone, in order to cause the animation to be displayed via a user interface of the callee's phone.

According to various exemplary embodiments, the animations generated by the animation generation module 204 may include media content representing the identities of the caller or callee, such as profile pictures, photographs, videos, company logos, etc. For example, one or more of the animation files may include code or instructions specifying animations where external image data may be inserted into the animation at specific positions and frames. The animation file may specify hook points/portions, insertion points/portions, or interleave points/portions in each frame of an animation, wherein an image specified by an external image file may be inserted into the animation at these hook points, insertion points, or interleave points, to thereby create a composite or interleaved animation including interleaved media content. In an example described above, if the caller and the callee have a Romantic relationship, the animation display system 200 may generate an animation of the caller's profile pic and the callee's profile pic moving together over a heart-shaped background, Thus, the corresponding animation file for this romance-related animation may specify a code or instructions for the animation of a heart-shaped background, and may specify hook points, insertion points, or interleave points where image data (e.g., representing profile pictures of the caller and callee) may be inserted into specific positions in the animation with respect to the heart-shaped background. In another example described above, if the caller and the callee have a business relationship, then the animation display system 200 may generate an animation of the caller at work in an office with a computer or file cabinet, with the company logo of the caller displayed on the wall of the office. Thus, the corresponding animation file for this business-related animation may specify a code or instructions for this animation that specify an office environment with an office file cabinet as a background, and may specify hook points, insertion points, or interleave points where image data (representing profile pictures of the caller, callee and/or company logos, etc.) may be inserted into specific positions in the animation with respect to the office environment background.

Figure 8:
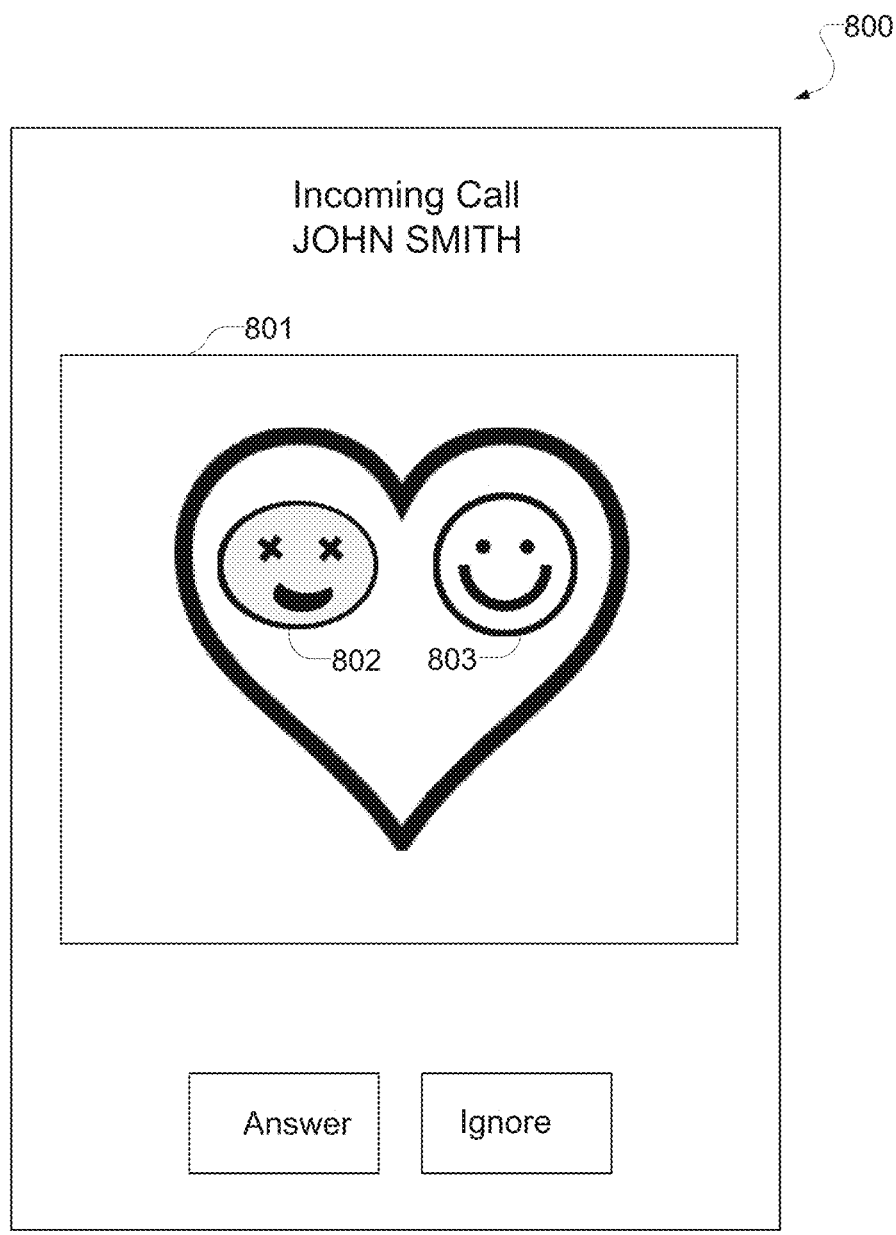
FIG. 8 illustrates an exemplary portion of a user interface displaying a notification of an incoming call, according to various embodiments.
Figure 9:
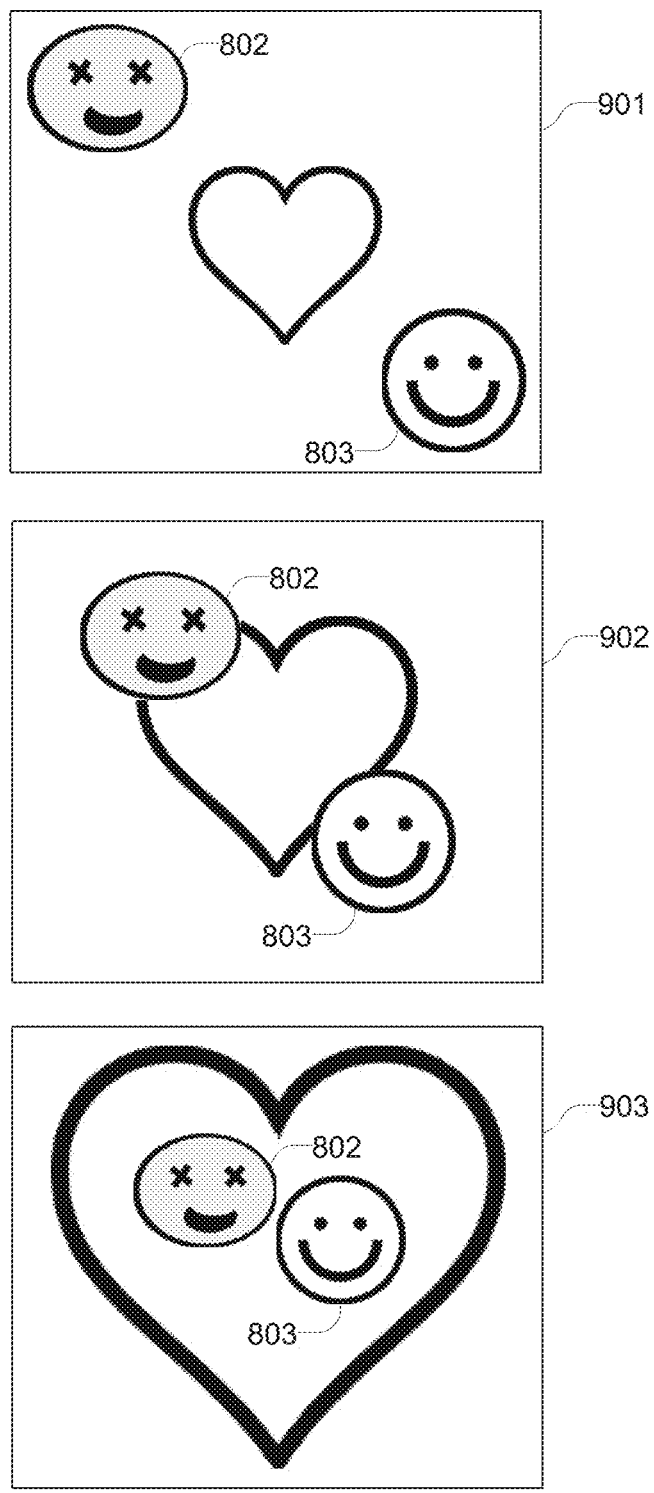
FIG. 9 illustrates an example of an animation sequence, according to various embodiments.
Figure 10:
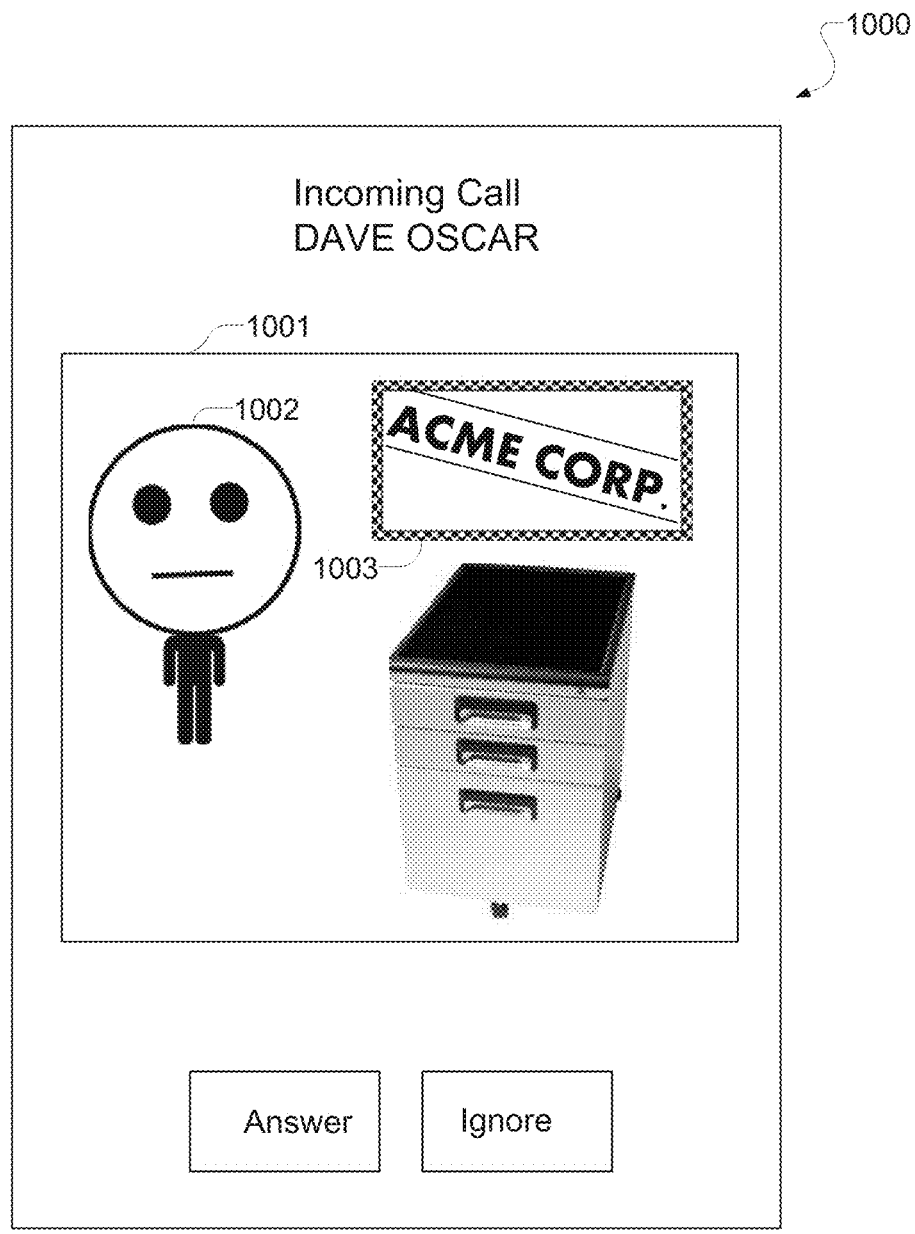
FIG. 10 illustrates an exemplary portion of a user interface displaying a notification of an incoming call, according to various embodiments.

For example, FIG. 8 illustrates an example of a notification screen 800 that may be displayed when a user receives an incoming call from the caller "John Smith", which is similar to the notification screen 600 illustrated in FIG. 6. As illustrated in FIG. 8, the notification screen 800 includes romance-related animation 801, similar to the romance related animation 601 illustrated in FIG. 6. Moreover, the romance-related animation 801 includes a profile picture or photograph 802 of the caller John Smith as well as a profile picture or photograph 803 of the callee, where romance-related animation 801 display the caller's profile pic and the callee's profile pic moving together over a heart-shaped background. It should be understood that the animation 801 illustrated in FIG. 8 is merely a screenshot or snapshot of a single frame in the animation. For example, FIG. 9 illustrates three frames 901, 902, and 903 corresponding to the example animation 801 illustrated in FIG. 8. FIG. 9 illustrates more clearly the nature of the example animation 801, wherein the profile picture or photograph 802 of the caller John Smith and the profile picture or photograph 803 of the callee may move closer to each other over the background of a heart-shape that is increasing in size. As another example, FIG. 10 illustrates an example of a notification screen 1000 that may be displayed when a user receives an incoming call from the caller "Dave Oscar", which is similar to the notification screen 700 illustrated in FIG. 7. As illustrated in FIG. 10, the notification screen 1000 includes business-related animation 1001, similar to the business-related animation 701 illustrated in FIG. 7. The business-related animation 1001 includes a profile picture or photograph 1002 of the caller Dave Oscar and a company logo 1003 of the caller Dave Oscar displayed on the wall of an office environment that includes an office file cabinet, wherein the animation may display the caller working in the office environment, opening or closing the file cabinets, etc. It should be understood that the animation 1001 illustrated in FIG. 10 is merely a screenshot or snapshot of a single frame in the animation. Thus, according to various exemplary embodiments, the animation display system 200 may access a number of animation rules corresponding to a number of relationships, where each of the animation rules specifies an animation that may be generated based on media content associated with one or more users having the corresponding relationship.

Figure 11:
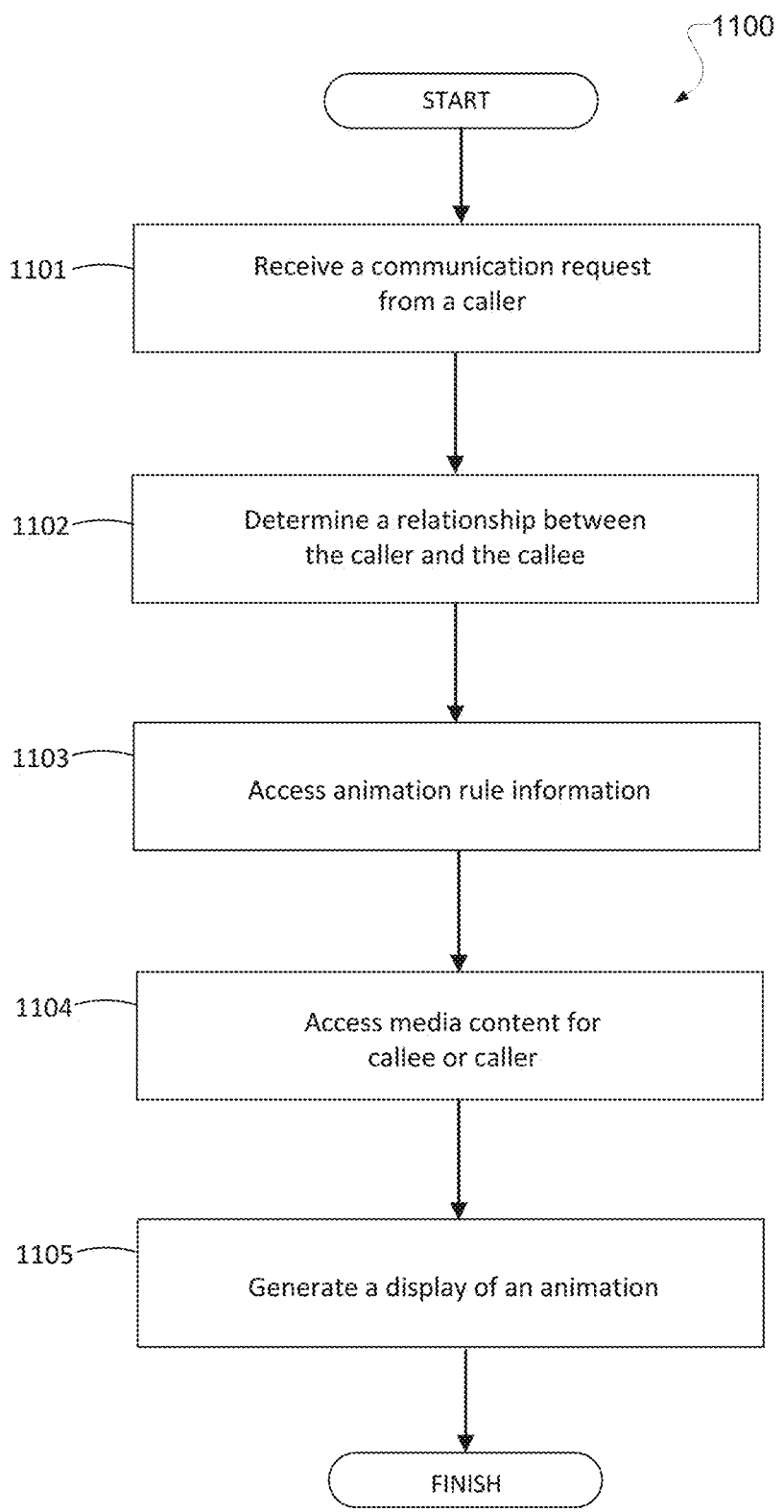
FIG. 11 is a flowchart illustrating an example method, according to various embodiments.

FIG. 11 is a flowchart illustrating an example method 1100, consistent with various embodiments described above. The method 1100 may be performed at least in part by, for example, the animation display system 200 illustrated in FIG. 2 (or an apparatus having similar modules, such as client machines 110 and 112 or application server 112 illustrated in FIG. 1). Operations 1101-1103 in the method 1100 are similar to operations 301-303 in the method 300 illustrated in 3. For example, in 1101, the determination module 202 receives, at a mobile device associated with a callee, a communication request from a caller. In 1102, the determination module 202 determines a relationship between the caller and the callee, based on user directory information. In 1103, the animation generation module 204 accesses animation rule information describing animation rules corresponding to various relationships. In 1104, the animation generation module 204 accesses media content corresponding to the callee or caller. For example, the media content may correspond to a photograph, picture, logo, video, or animation associated with the callee or caller. Finally, in 1105, the animation generation module 204 generates a display of an animation, via a user interface in the mobile device of the callee, based on a specific one of the animation rules in the animation rule information that corresponds to the relationship determined in 1102 (i.e., the relationship between the caller and the callee). For example, the animation may be generated based on the media content corresponding to the callee or the caller that was accessed in 1104.

Figure 12:
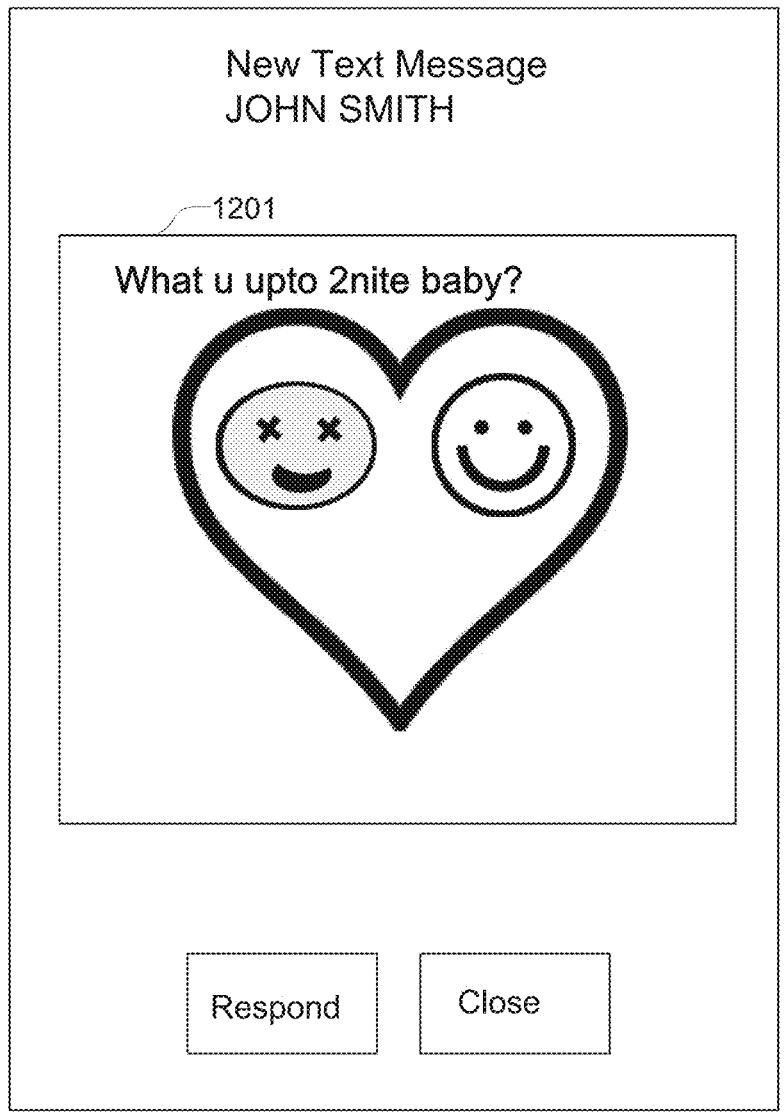
FIG. 12 illustrates an exemplary portion of a user interface displaying a text message, according to various embodiments.
Figure 13:
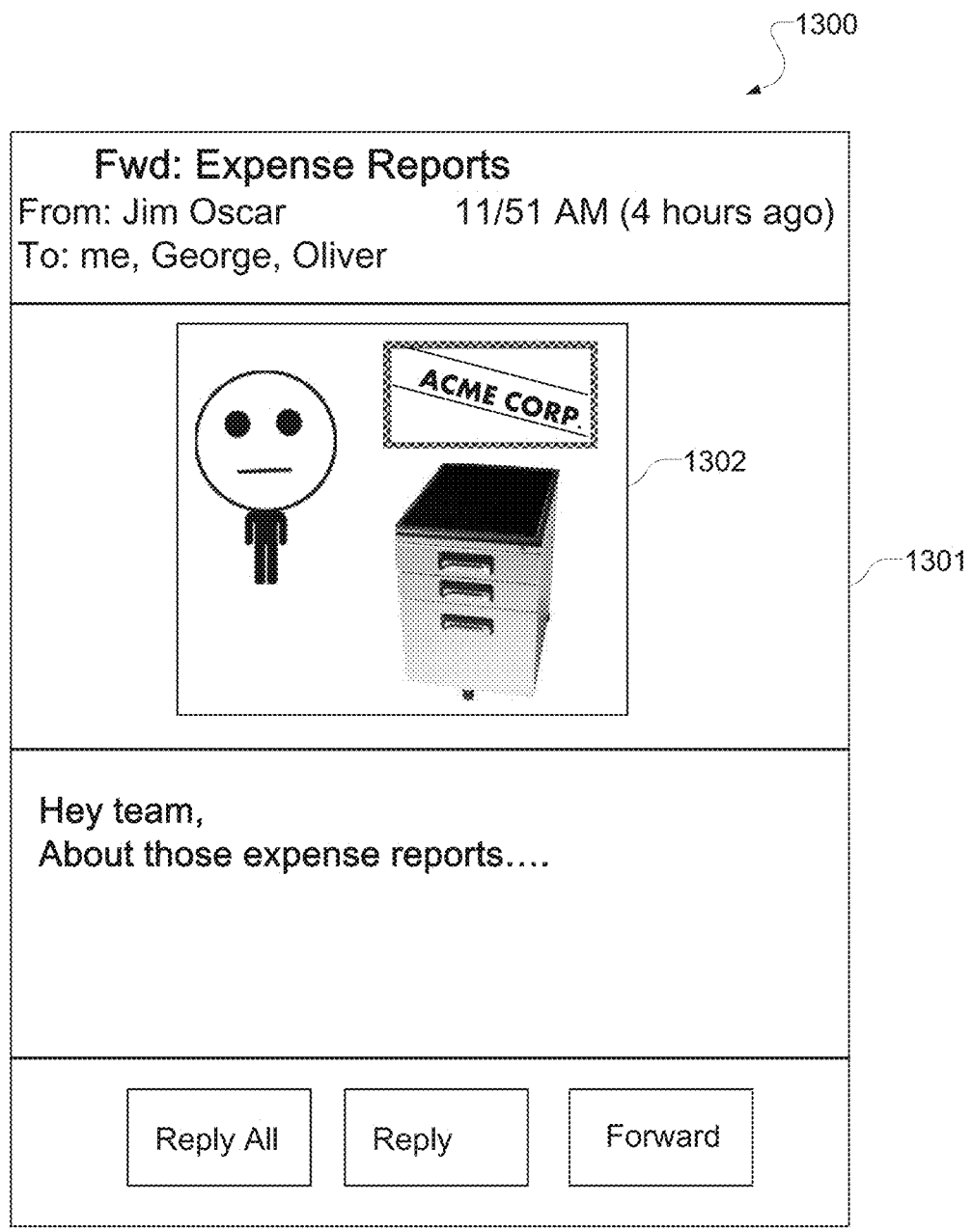
FIG. 13 illustrates an exemplary portion of a user interface displaying an email message, according to various embodiments.

While various exemplary embodiments throughout refer to a "call" or telephone call as an example of an electronic communication request, it should be understood that the various embodiments of this disclosure are applicable to any type of electronic communication or electronic communication request. For example, other types of electronic communications or electronic communication requests include e-mail messages, notifications, text messages (e.g., short message service or SMS messages, multimedia messaging service or MMS messages, etc.), instant messages, chat requests, video chat request, and so on. For example, FIG. 12 illustrates an example of an exemplary portion of a user interface displaying a notification of a text message 1200 received from the user John Smith. As illustrated in FIG. 12, the content portion of the text message 1201 includes the actual text message "What u upto 2nite baby?", as well as an animation in the background of the content portion of the text message (similar to the romance-related animation illustrated in FIG. 8). As another example, FIG. 13 illustrates an example of an exemplary portion of a user interface displaying an e-mail message 1300 received from the user Dave Oscar. As illustrated in FIG. 13, the content portion of the e-mail message 1300 includes the actual text of the e-mail message "Hey team . . . ", Moreover, a banner portion 1301 of the e-mail 1300 displays an animation 1302, similar to the business-related animation 1001 illustrated in FIG. 10. According to an exemplary embodiment, animations generated by the animation display system 200 may be displayed underneath other content, such as text or graphics included in a text message, email, etc., such that the animation appears as if it is embedded or blended into the background of the text message, email, etc. For example, the animation display system 200 may generate and display animations utilizing the technique of "alpha blending", which involves a convex combination of multiple colors allowing for transparency and translucency effects in computer graphics, using different perceived layers of colour, material and texture. The technique of alpha blending is known by those skilled in the art and will not be described in more detail, in order to avoid occluding the aspects of this disclosure.

It will be apparent to those skilled in the art that the exemplary "caller" referenced in various embodiments throughout may correspond to any source or sender of any type of electronic communication or electronic communication request. The exemplary "callee" referenced in various embodiments throughout may correspond to any destination or recipient of any type of electronic communication or electronic communication request. While various exemplary embodiments throughout refer to the display of animations, the aspects of this disclosure are applicable to the display of other types of content such as, for example, images, pictures, graphics, illustrations, drawings, photographs, videos, stills or frames of animations or videos, and so on. According to various exemplary embodiments, the animations displayed by the animation display system 200 may include the media content representing the caller or callee in an animation that is not necessarily related to the relationship between the caller and the callee. Any of the animations described throughout may be displayed during an active phone conversation. For example, after the callee selects an "Answer" button in a notification screen that may or may not display an animation (e.g., see FIG. 6), the animation display system 200 may then display the animation in the background of the user interface of the callee's mobile device during the active phone conversation.

As described in various embodiments above, the determination module 202 is configured to determine a relationship between the caller and callee, based on user directory information. For example, according to an exemplary embodiment, the relationship information included in the user directory information may be defined based on user input by the callee that is the owner of the user directory information. An example of user directory information 400 is illustrated in FIG. 4, wherein the user directory information 400 may correspond to a contact list, phonebook, directory, etc., of the prospective callee. Accordingly, by modifying the contact list, phonebook, directory, etc., corresponding to the user directory information 400, the user is able to specify the relationship data included in the user directory information 400.

Figure 14:
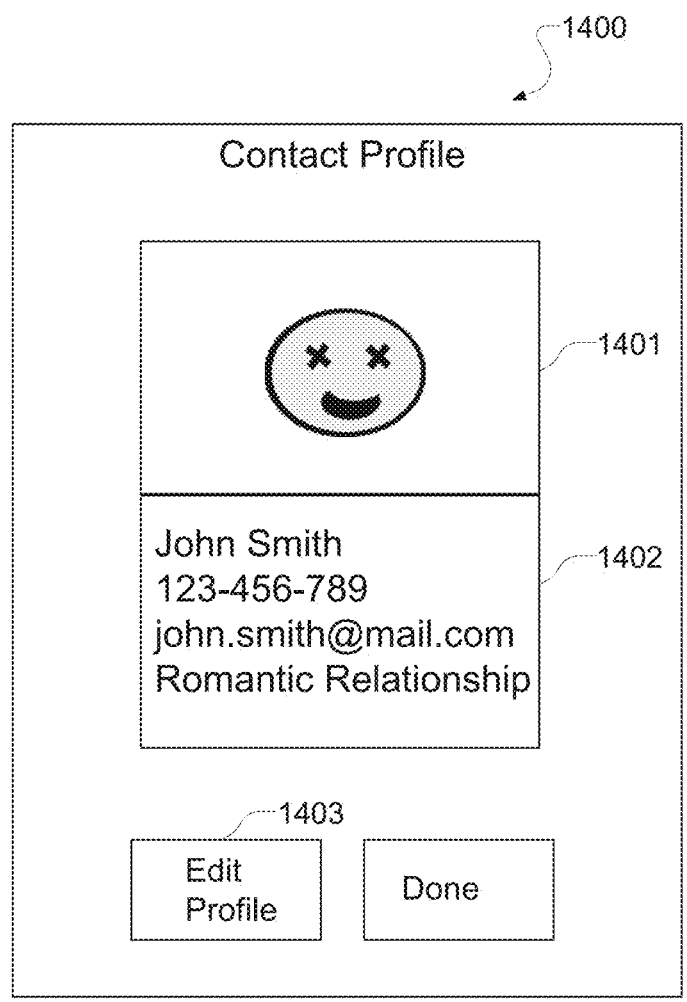
FIG. 14 illustrates an exemplary portion of a user interface displaying a profile of a contact, according to various embodiments.
Figure 15:
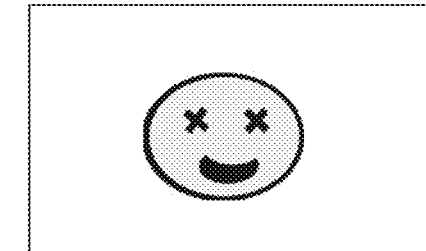
FIG. 15 illustrates an exemplary portion of a user interface for editing a profile of a contact, according to various embodiments.

For example, FIG. 14 and FIG. 15 illustrates examples of user interfaces 1400 and 1500 that may be displayed by the animation display system 200 on a device, such as a mobile device or smartphone associated with the prospective callee. The user interface 1400 displays a profile page for the contact "John Smith", including information in the corresponding entry in the user directory information 400 for the contact "John Smith". As illustrated in FIG. 14, the profile page 1400 displays a profile picture 1401 of the contact, and includes various contact information 1402 about the contact, including name, phone number, e-mail, relationship, etc. The callee may select the "Edit Profile" user interface element 1403 (e.g., user interface button) in order to edit the various information (including name, telephone number, e-mail, and relationship) associated with this contact. For example, if the user selects the "Edit Profile" user interface element 1403, then the animation display system 200 may display, via a user interface in a device, of an edit page 1500 illustrated in FIG. 15, which permits the user to edit to various information about the contact "John Smith", such as name, organization, phone and e-mail. In other words, the user interface 1500 enables the user to modify the corresponding entry in the user directory information 400 corresponding to the contact "John Smith". The user interface 1500 of FIG. 15 allows the callee to specify or define a relationship between this particular contact and the callee, such as a romantic relationship, family relationship, business relationship, friend relationship, etc. For example, as illustrated in FIG. 15, it can be seen that the callee has specified that the relationship between the contact "John Smith" and the callee is a romantic relationship. Moreover, the user interface 1500 permits the callee to change a profile picture of the contact.

Figure 16:
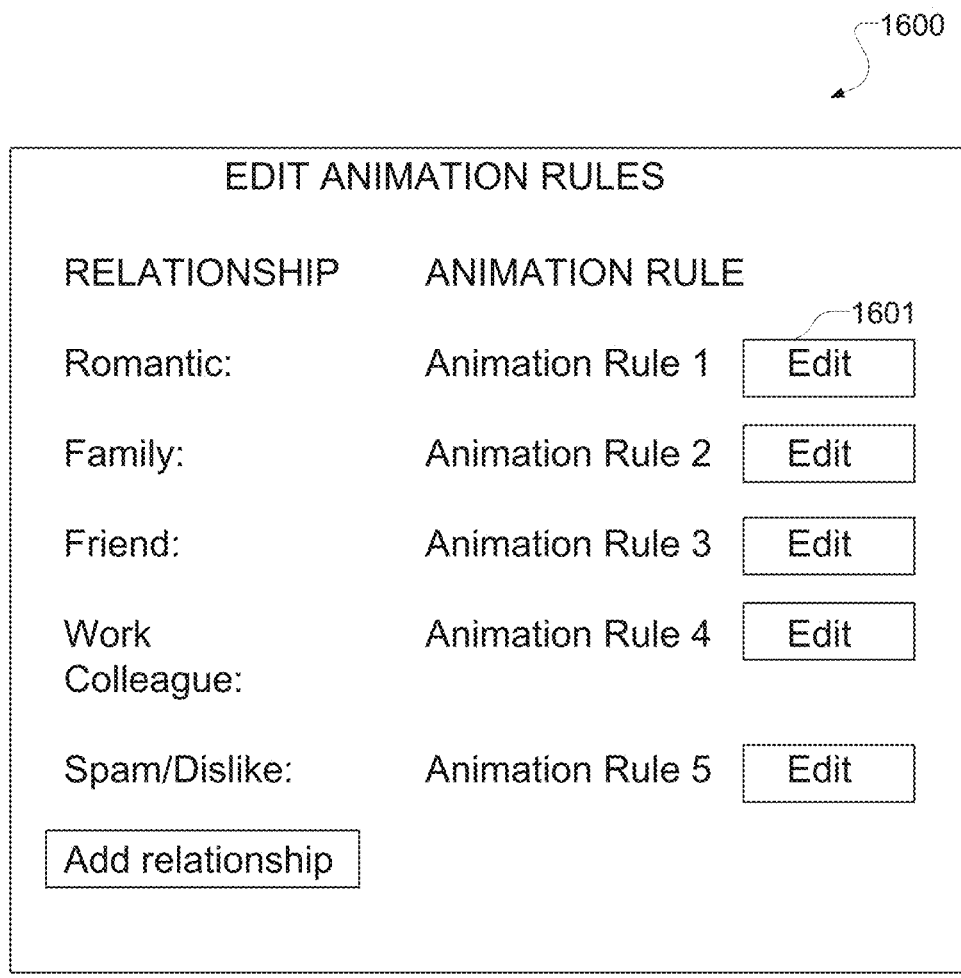
FIG. 16 illustrates an exemplary portion of a user interface for editing animation rules, according to various embodiments.

Consistent with various embodiments described above, the animation generation module 204 accesses animation rule information describing animation rules corresponding to a various relationships. According to various exemplary embodiments, the user of the animation display system 200 is permitted to select, specify, or define the animation and/or animation rule corresponding to each relationship. FIG. 16 illustrates an example of a user interface displaying an edit page 1600 enabling the callee to edit the animation rules associated with each of the relationships (e.g., the user can edit the animation rule 1 corresponding to the romantic relationship, or edit the animation rule 2 corresponding to the family relationship, etc.). For example, if the user selects the edit button 1601 in order to edit the animation rule 1 corresponding to the romantic relationship, the animation display system 200 may display the user interface 1700 illustrated in FIG. 17, which allows the user to specify the animation for animation rule 1 by, for example, selecting from one of a number of predefined animation samples or templates, such as templates A-F illustrated in FIG. 17. If the user selects one of the animation templates, the animation display system 200 may display more information about the selected animation template and enable the user to specify this selected animation template as the animation for the appropriate animation rule 1.

Figure 17:
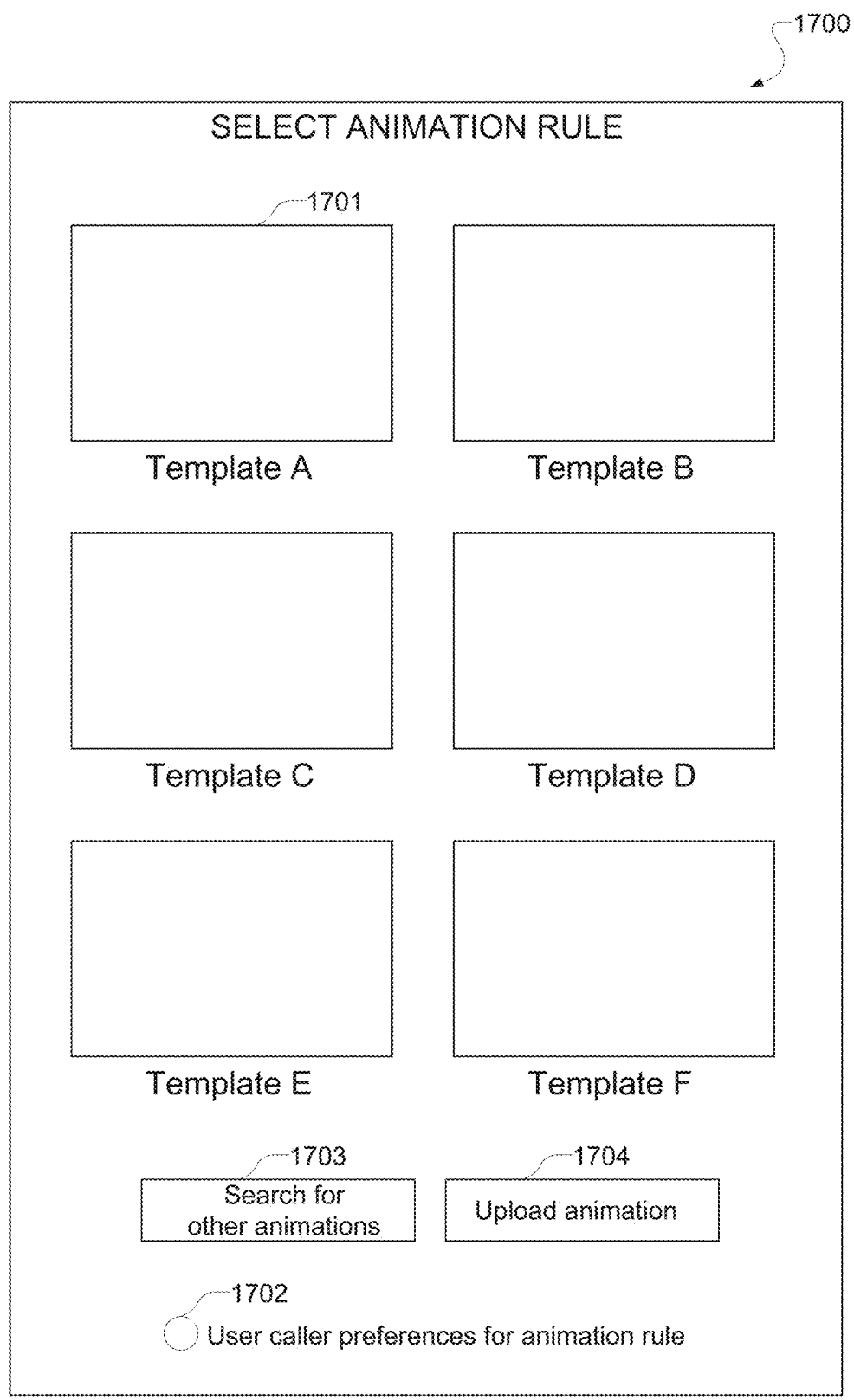
FIG. 17 illustrates an exemplary portion of a user interface for editing an animation rule, according to various embodiments.
Figure 18:
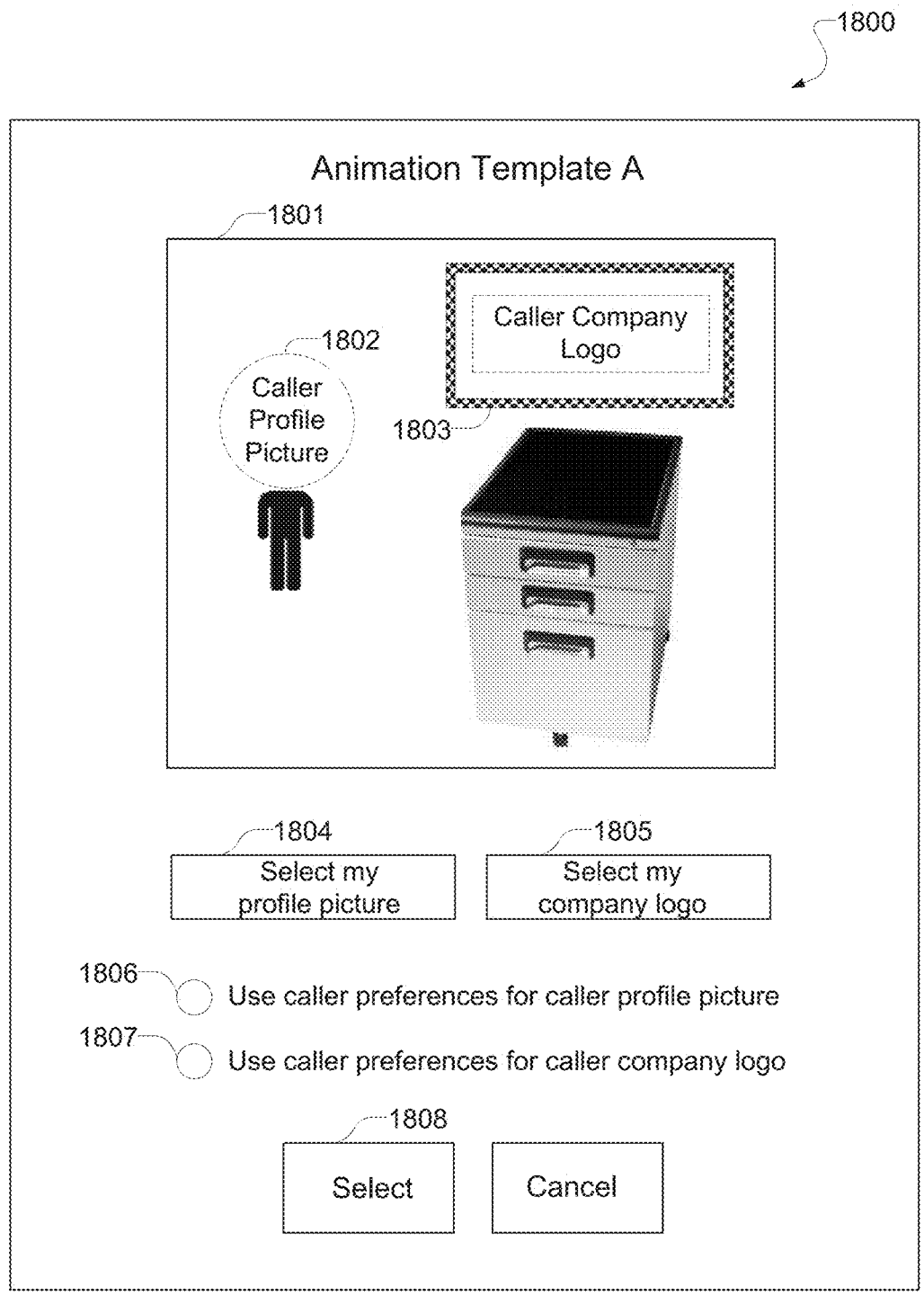
FIG. 18 illustrates an exemplary portion of a user interface for editing an animation rule, according to various embodiments.

For example, if the user selects on the Animation Template A 1701 illustrated in FIG. 17, the animation display system 200 may display the user interface 1800 illustrated in FIG. 18 which allows the user to view the Animation Template A displayed in the animation window 1801. As illustrated in FIG. 18, the animation window 1801 displaying the Animation Template A may indicate portions where various external media content (e.g., profile pictures or logos of the caller or callee) may be inserted. For example, the animation window 1801 displays a business-related animation similar to the business-related animation 1001 illustrated in FIG. 10, where the blank portions 1802 and 1803 indicate where the caller profile picture and caller company logo respectively may be inserted by the animation display system 200. According to various embodiments, the animation display system 200 may automatically obtain the external media content (e.g., profile picture of the caller and the company logo of the caller) and insert the media content into the appropriate positions 1802 and 1803 in an animation displayed in a notification screen in conjunction with an incoming call from a caller. The animation display system 200 may obtain the external media content corresponding to various users (such as profile pictures, graphics, photographs, videos, company logos, etc.) via the links included in the user directory information 400 illustrated in FIG. 4. The user interface window 1800 also includes buttons 1804 and 1805 allowing the user (callee) to specify their own profile picture, company logo, or other media content for insertion (if applicable) into the animation displayed in the animation window 1801. According to various embodiments, if the user selects and drags one of the blank portions 1802 or 1803 (e.g., by controlling a cursor via user manipulation of a mouse or trackpad), the user can drag these portions 1802 and 1803 in order to change the positions where the corresponding media content will be inserted. If the user selects the "Select" button 1808, the user may specify this selected animation in the animation window 1801 as the animation for the appropriate animation rule 1.

Figure 19:
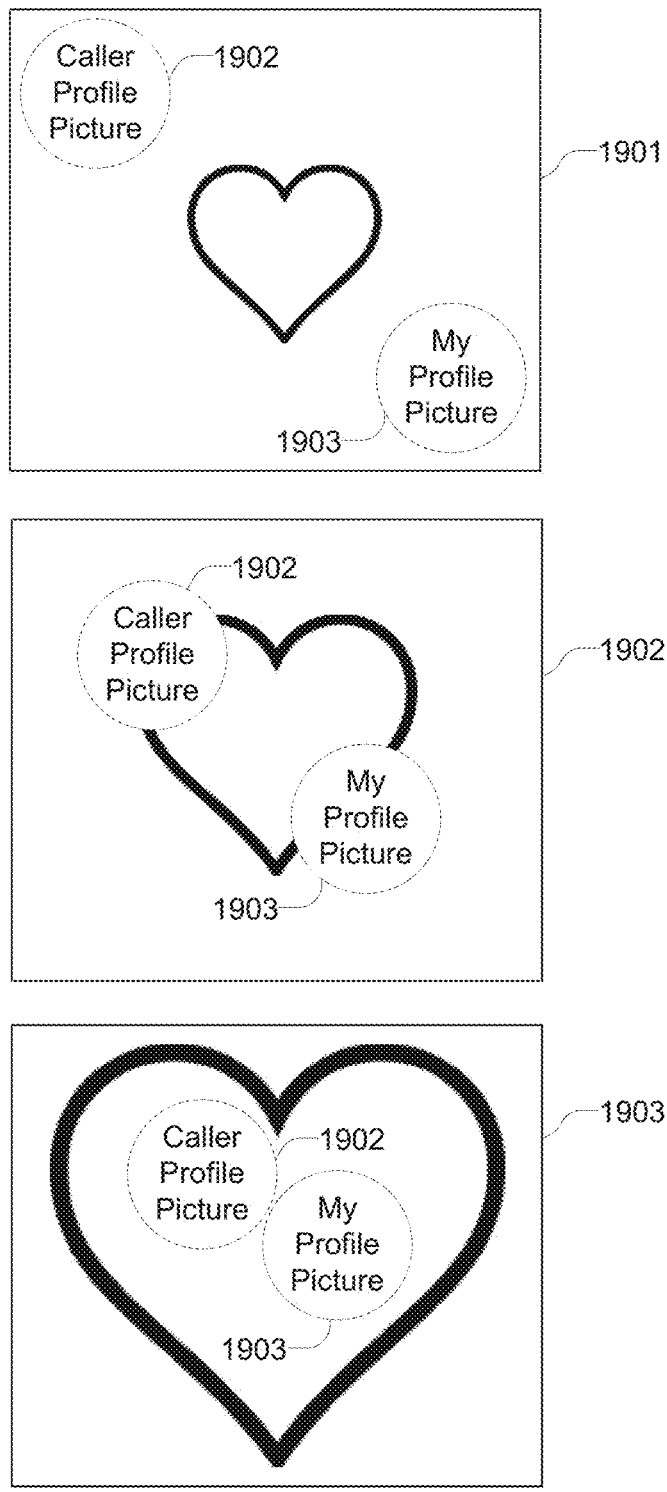
FIG. 19 illustrates an example of an animation sequence, according to various embodiments.

FIG. 19 illustrates another example of an animation (including three separate animation frames 1901-1903 in an animation sequence) that may be displayed in the animation window (e.g., see animation window 1801 in FIG. 18) In particular, the animation illustrated in FIG. 19 may correspond to the animation illustrated in FIG. 9. Thus, an animation window displaying the animation in FIG. 19 indicates insertion points where the profile picture of the caller 1902 and the profile picture of the callee 1903 may be inserted.

Consistent with various exemplary embodiments described above, the profile picture of the caller may be specified in user directory information, phone book, phone list, contact list, contact directory, etc. of the callee, which may be stored locally on the caller's mobile phone or which may be stored remotely in a storage repository accessible via a network (e.g., the Internet). According to another exemplary embodiment, the profile picture or company logo of the caller may actually be provided by the caller before or during a telephone call. For example, information representing the profile picture or company logo of the caller may be included in data corresponding to a communication request (e.g., telephone call, text message, instant message etc.) that is transmitted to the mobile device of the callee.

According to various exemplary embodiments, the user may select the user interface buttons 1806 and 1807 in FIG. 18 in order to use the caller's preferences for the caller profile picture and caller company logo (as opposed to utilizing a profile picture or a company logo of the caller that is already included in the user directory information of the callee). In other words, when the callee's device receives the communication request from the caller, the data of this communication request may include the information representing the caller's profile picture, the caller's company logo, etc. Thus, the animation display system 200 may obtain this information and insert it into an animation, if appropriate. For example, the animation display system 200 may obtain the caller profile picture and caller company logo and insert them into the appropriate positions 1802 and 1803 in the animation displayed in the window 1801. A user (e.g., a callee) may override such caller-dictated preferences by selecting or de-selecting the user interface selection buttons 1806 and 1807, as appropriate.

Consistent with various exemplary embodiments, the animation rule for a given relationship may be specified by the callee, by using the user interface in FIG. 16, for example. According to another exemplary embodiment, the caller may specify the animation and/or animation rule. For example, if the user selects the user interface element 1702 illustrated in FIG. 17, the animation display system 200 may access data included in a communication request from the caller (e.g., telephone call, text message, instant message, etc.) that identifies an animation rule or animation information, and display an animation based on this accessed data.

The animations described throughout (e.g., the animations samples/templates illustrated in FIG. 17) may be developed by a third party and imported onto the mobile device of the callee or server, for access by the animation display system 200. For example, if a prospective callee selects the "Search for other animation" button 1703 in FIG. 17, the user can search for a variety of animation templates which may be developed by a third party and which may be stored remotely on a server, data repository, application, website, or software service that is accessible by the mobile device of the callee via a network (e.g., the Internet). Alternatively, the user can install or create their own custom animations. For example, if the user select the "Upload animation" button 1704 illustrated in FIG. 17, the user can browse for and select an animation file for upload to the animation display system 200 (e.g., the uploaded animation may be displayed as one of the animation samples/templates illustrated in FIG. 17).

According to various exemplary embodiments, animations or animation templates (e.g., calling cards) may be created by users and shared through face-to-face meetings with other users. For example, a user Steve Smith may generate an animation and store it on his mobile device, and may share this animation with another user by transmitting it to the other user's online storage account or mobile device (e.g., via Bluetooth or near field communications (NFC)). As another example, electronic communications transmitted between users (e.g., e-mails, text messages, etc. may include links to animations (e.g., calling cards) associated with the sender. Animations may thus be accessed by the animation display system 200 and stored in an online storage account or on the mobile device of the recipient, for use in displaying animations on the recipient's mobile device (e.g., such animations may be displayed in the user interface in FIG. 17). According to an exemplary embodiment, the animation display system 200 enables a recipient of an animation to preview the animation before accepting installation of the animation in the online storage account or mobile device of the recipient. According to various exemplary embodiments, the animations may be transmitted together with distribution rules or policies governing the distribution of such animations. For example, an animation may transmitted together with a distribution rule stating that the animation may not be shared with others after it is transmitted to a first recipient. According to various exemplary embodiments, the animations may be transmitted together with rules restricting whether or not the animations may collect or emit any information (e.g., user profile information, user contact information, etc.) while executing on a recipient's mobile device.

According to an exemplary embodiment, the animation display system 200 may also send an animation back from the caller's mobile device to the caller's mobile device. For example, if the callee selects the "Answer" button in a notification of an incoming call (e.g., see FIG. 6), the animation display system 200 may transmit an animation back to the caller's mobile device for display on the caller's mobile device, where the may include any of the features described in various embodiments throughout. As another example, if the user selects the "Ignore" button in a notification of an incoming call (e.g., see FIG. 6), the animation display system 200 may transmit an animation back to the caller mobile device, where the animation may include text, pictures, graphics, or other content indicating that the callee is unable to answer. For example, the animation may include the text "I'm answering another call right now, but I'll get back to you as soon as I can", with an animation of the callee holding multiple phones. Other examples of animations indicating various communication statuses will be apparent to those skilled in the art (e.g., "Busy", "Away From Desk", "Out of Office", "Working from Home", "On Vacation", "Out of Town").

Turning now to FIGS. 20-23, according to various exemplary embodiments, when a call is received from a caller, the animation display system 200 may display an animation on the callee's device that includes information about the location of the caller, or in some way represents or depicts the location of the caller. The determination module 202 may determine or access the location of the caller (or the caller's mobile device) in any one of various ways. For example, according to various exemplary embodiments, the communication request received from the caller (e.g., incoming phone call received via a cellular or VoIP network, incoming e-mail, incoming text message, incoming instant message, incoming video chat request, etc.) may include data representing the location of the caller. Such location data may be generated by the caller's mobile device using any one of various methods understood by those skilled in the art, including through the use of global positioning systems (GPSs) or geo-location systems installed in the caller's mobile device. As another example, the determination module 202 may access the location of the caller from a remote online repository or database accessible via a network (e.g., the Internet). As another example, the determination module 202 may determine the location of the caller by accessing current location information posted a social media account of the caller hosted by a social networking service, such as Facebook.

Figure 20:
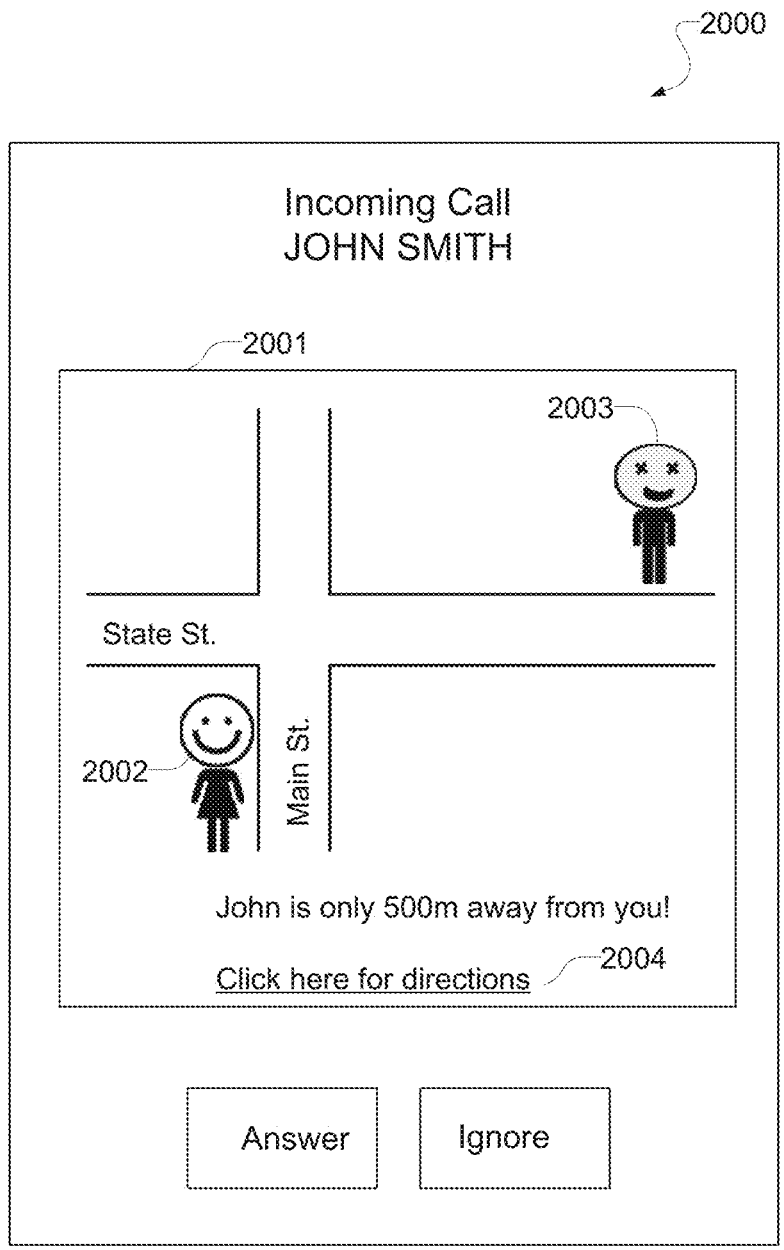
FIG. 20 illustrates an exemplary portion of a user interface displaying a notification of an incoming call, according to various embodiments.

After the determination module 202 determines the current location of the caller (or the caller's mobile device), the animation generation module 204 may display an animation including a map that identifies or depicts the current location of the caller. For example, the determination module 202 may determine the street address location of the caller, and the animation generation module 204 may access a map image that illustrates the determined street address. For example, the animation generation module 204 may access a mapping application or an API of a mapping application (such as Google maps) and request a map that illustrates the determined street address. For example, FIG. 20 illustrates an example of a notification screen 2000 displayed on the callee's mobile device by the animation display system 200, when the callee receives a call from a caller John Smith. The notification screen 2000 displays a map 2001 that includes indicia 2003 that identifies the current location of the caller John Smith. The indicia may include media content 2003 representing the caller, such as a profile picture of the caller, consistent various embodiments described above.

As illustrated in FIG. 20, the determination module 202 may also determine the location the callee (or the callee's mobile device) using any one of the methods known to those skilled in the art, and the map 2001 displayed by the animation generation module 204 may also depict the current location of the callee with respect to the caller. The map 2001 may include media content 2002 representing the callee, such as a profile picture of the callee, consistent various embodiments described above. The map 2001 may correspond to an animation (e.g., an animation of a moving map, and animation zooming in or zooming out of a map, an animation of a map where the representation of the caller or callee is moving, possibly based on the movement of the mobile devices of the caller or callee, etc.). The notification 2000 displayed by the animation display system 200 may also identify the distance between the current location of the caller and the current location of the callee, as well as a link 2004 for accessing directions to enable the callee to travel to the current location of the caller.

The animation display system 200 may include various privacy-related provisions for confirming that a caller or callee has authorized the dissemination and display of their current location. For example, the animation display system 200 may require the caller to "opt-in" before the current location of the caller is displayed in an animation. According to various exemplary embodiments, if the caller "opts-in" or otherwise provides approval for display of caller location information, the communication request transmitted to the callee may include authorization information indicating that the animation display system 200 is authorized to access and display the location of the caller. Alternatively, the authorization information may instead or in addition be stored remotely on a server, data repository, application, website, or software service that is accessible by the mobile device of the callee via a network (e.g., the Internet), although such storage on a remote server is optional. Similarly, the animation display system 200 may require the callee to "opt-in" before the current location of the callee is displayed in an animation, such as in an animation transmitted to a caller device as described in various embodiments above. According to various exemplary embodiments, if the callee "opts-in" or otherwise provides approval for display of callee location information, the animation transmitted back the caller's mobile device may include authorization information indicating that the caller's mobile device is authorized to access and display the location of the caller. Alternatively, the authorization information may instead or in addition be stored remotely on a server, data repository, application, website, or software service that is accessible by the mobile device of the callee via a network (e.g., the Internet), although such storage on a remote server is optional.

Figure 21:
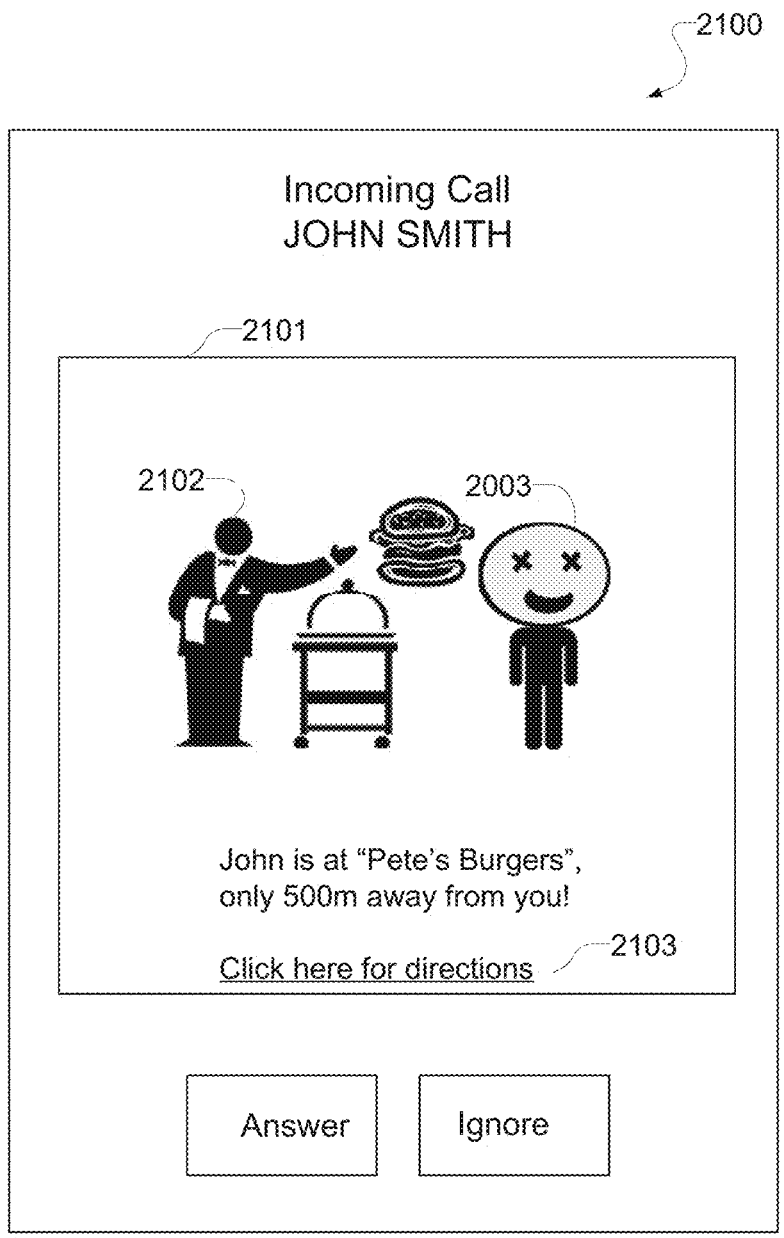
FIG. 21 illustrates an exemplary portion of a user interface displaying a notification of an incoming call, according to various embodiments.

According to various embodiments, the animation may include content that depicts the location of the caller or an activity likely being performed by the caller at their current location. For example, after the animation display system 200 identifies the current location of the mobile device of the caller, the determination module 202 may compare this location against a database listing known features located at that location (such as streets, homes, landmarks, tourist attractions, venues, structures, establishments buildings, businesses, restaurants, shopping destinations, parks, schools, etc.). Thereafter, the animation generation module 204 may access and display an animation associated with this feature located at the location of the caller. For example, if the determination module 202 determines that the caller is located at a restaurant, then the animation generation module 204 may access a restaurant-related animation. As another example, if the determination module 202 determines that the caller is located at shopping establishment, then the animation generation module 204 may access a shopping-related animation. For example, FIG. 21 illustrates an example of a notification screen 2100 displayed on the callee's mobile device by the animation display system 200, when the callee receives a call from a caller John Smith. If the determination module 202 has determined that the caller John Smith is located at a restaurant "Pete's Burgers", then the animation generation module 204 may display a restaurant-related animation 2102, as illustrated in the animation window to 2201. The animation 2100 may include media content 2003 representing the caller, such as a profile picture of the caller, consistent various embodiments described above. Animation 2100 displayed by the animation display system 200 may also identify the distance between the current location of the caller and the current location of the callee, as well as a link 2103 for accessing directions to enable the callee to travel to the current location of the caller.

Figure 22:
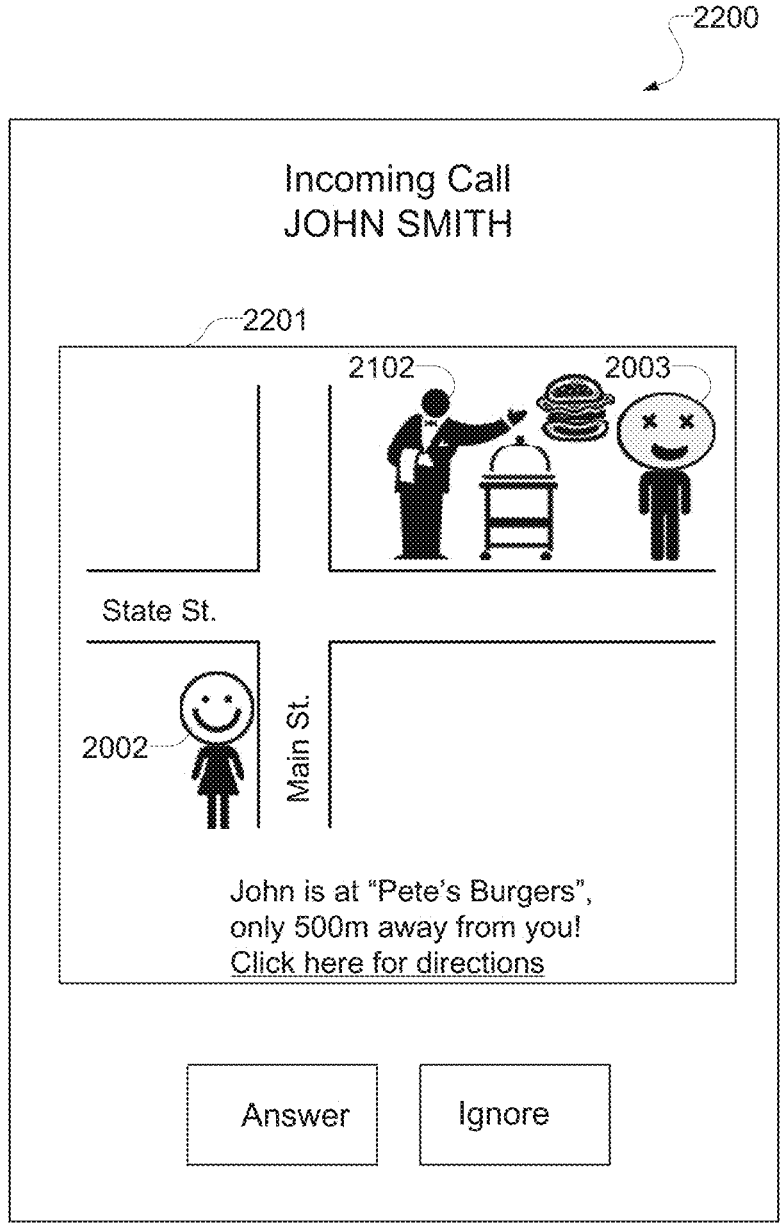
FIG. 22 illustrates an exemplary portion of a user interface displaying a notification of an incoming call, according to various embodiments.

According to various embodiments, the animation display system 200 may display an animation combining a map identifying the current location of the caller (as illustrated in FIG. 20) and a location-specific animation (as illustrated in FIG. 21). For example, FIG. 22 illustrates an example of a notification screen 2200 displayed on the callee's mobile device by the animation display system 200, when the callee receives a call from a caller John Smith. The notification 2200 includes an animation 2201 that includes a map illustrating the current location of the caller 2003 and the current location of the callee 2002, as well as a location-specific animation 2102 that depicts the location of the caller or an activity likely being performed by the caller at their location.

Accordingly to various exemplary embodiments, the animation display system 200 may display or utilize the current location of a caller in an animation (e.g., see animations in FIGS. 20-22), in response to the distance between the caller and the callee being less than a predetermined threshold, indicating that the caller and callee are geographically close or within the same vicinity.

Figure 23:
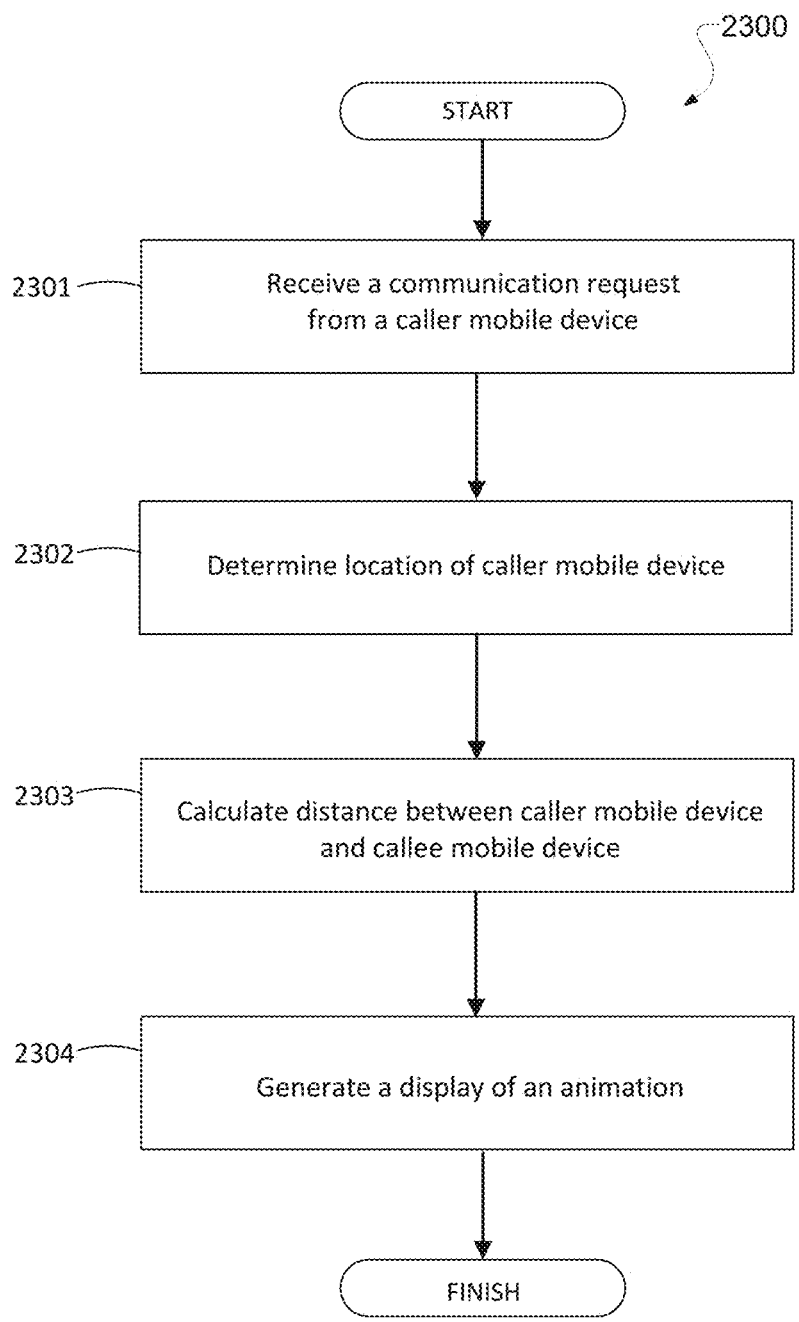
FIG. 23 is a flowchart illustrating an example method, according to various embodiments.

FIG. 23 is a flowchart illustrating an example method 2300, consistent with various embodiments described above. The method 2300 may be performed at least in part by, for example, the animation display system 200 illustrated in FIG. 2 (or an apparatus having similar modules, such as client machines 110 and 112 or application server 112 illustrated in FIG. 1). In 2301, the determination module 202 receives, at a mobile device associated with a first user (the "callee"), a communication request from a second user (the "caller"). In 2302, the determination module 202 determines a current location of a second mobile device associated with the caller. In 2303, the determination module 202 calculates a distance between the current location of the second mobile device of the caller and a current location of the first mobile device of the callee. (Note that 2303 is optional). In 2304, the animation generation module generates a display of an animation in the mobile device of the callee. The animation may include a map identifying the current location of the caller (see FIG. 20). The animation may include a location-specific animation based on the current location of the caller (see FIG. 21). The animation may display a distance between the current location of the caller and the callee, and directions (or a link to directions) to the current location of the caller.

According to various exemplary embodiments, the animation system 200 may also be used to protect a user against automated solicitation calls, commonly referred to as robot calls, robo calls or spam calls. For example, if the animation display system 200 detects an incoming call at the callee's mobile device from an unknown caller (e.g., a caller not in the user directory information of the callee), and if the animation display system 200 determines that the current location of the caller cannot be determined, then the animation display system 200 may display an animation or notification on the callee's mobile device informing the callee of these facts. Thus, the callee can choose not to answer the call, since the callee cannot confirm where the call is coming from or the current location of the caller. As another example, after the animation display system 200 detects an incoming call at the callee's mobile device from an unknown caller (e.g., a caller not in the user directory information of the callee), the animation display system 200 may transmit a test animation back to the caller's mobile device. The test animation may include a simple puzzle, game, question, query, password request, secret code request, etc., to be solved, answered, or otherwise completed by the caller. If the caller does not successfully complete the test animation as expected, then a signal may be transmitted back to the animation display system 200, which may display an animation or notification on the callee's mobile device indicating that the current incoming call may be a robot call, robo call or spam call. Thus, the callee can choose not to answer the call.

According to various exemplary embodiments, the caller's interactions with the test animation (e.g., the attempts to solve the puzzle by the caller) may be displayed in real-time on the callee's mobile device. As the caller interacts with the test animation by, for example, moving pieces of a puzzle or typing an answer into an answer entry field, this information may be transmitted back to the callee's mobile device via the animation display system 200, and the interaction may be displayed in real-time on the callee's mobile device. Thus, even if the caller is not successfully completing the puzzle, the callee can still choose to answer the call, if it appears that the caller is a person making a bona-fide attempt to solve the puzzle, as opposed to a robo-call system that is not actively interacting with the puzzle, for example. Note that this real-time viewing of the caller attempting to solve a puzzle may require internet access on the part of both the caller's mobile device and the callee's mobile device, in order to allow for two way digital communication between the mobile devices of the test animation and the interaction data.

According to various exemplary embodiments, instead of transmitting a test animation directly to the caller's mobile device, the animation display system 200 may automatically transmit a text message to the caller with instructions and/or a link for accessing a website or application for activating a task (e.g., a simple puzzle, game, question, query, password request, secret code request, etc.) to be solved, answered, or otherwise completed by the caller for the purposes of screening against automated solicitation calls such as robo calls.

According to various exemplary embodiments, if the caller is placing a call from a telephonic device other than a cell phone (e.g., a phone connected to a landline, a pay phone, a kiosk, etc.), after the animation display system 200 detects the incoming call at the callee's mobile device, the animation display system 200 may transmit a recorded message back to the caller for playback. The recorded message may include instructions and/or links for accessing a website, application, and/or another interactive device for activating a task (e.g., a simple puzzle, game, question, query, password request, secret code request, etc.) to be solved, answered, or otherwise completed by the caller for the purposes of screening against automated solicitation calls such as robo calls. According to various exemplary embodiments, in a case where the caller does not have access to the internee or an Internet-connected device, the recorded message may include an interactive voice-based gateway menu that asks questions and permits the user to answer the questions using voice responses and/or key pad entries. For example, the interactive voice-based gateway menu may ask questions to defend against robo calls such as: "Press 1 to access interactive menu for caller authentication", "What is the capitol city of Mongolia?", "Using your keypad, spell Cat", "What is the third letter of the second month of the year", "What is the caller's last name?", "Enter your phone number to receive a text for validation instructions", and so on.

According to various exemplary embodiments, the test animation including a puzzle may be transmitted with various security provisions such as time limits in order to further defend the callee against Robo calls. For example, the security provisions may state that the puzzle is temporary and is time locked (such that it can only be executed within a certain time interval, to prevent memorization of puzzle solutions by recipients), or that the puzzle has an execution limit indicating that it can only be run once, or that the puzzle has a maximum amount of time for completion (e.g., 15 seconds), or that the puzzle requires entry of contact information of the caller (e.g., callback number) for texting or otherwise transmitting a check value for inclusion in the puzzle, etc.

Figure 24:
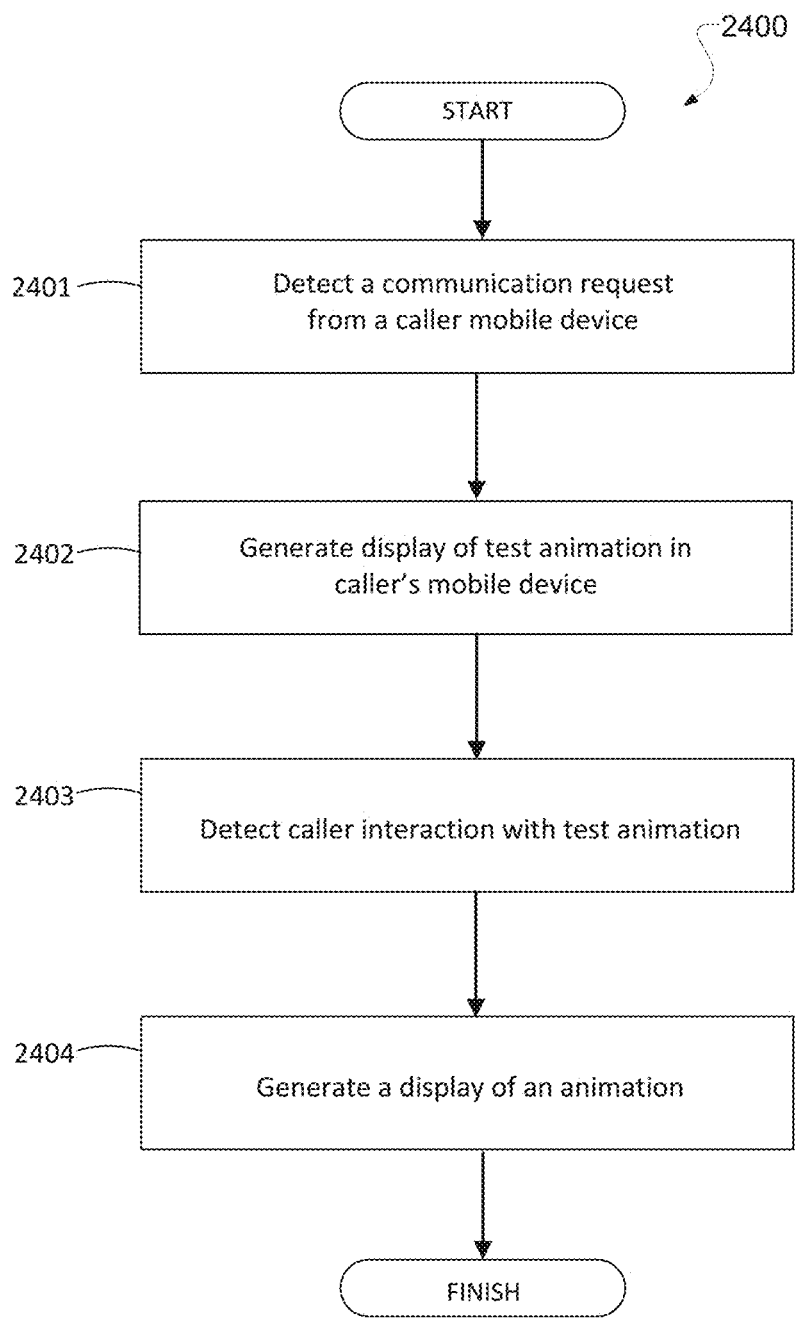
FIG. 24 is a flowchart illustrating an example method, according to various embodiments.

FIG. 24 is a flowchart illustrating an example method 2400, consistent with various embodiments described above. The method 2400 may be performed at least in part by, for example, the animation display system 200 illustrated in FIG. 2 (or an apparatus having similar modules, such as client machines 110 and 112 or application server 112 illustrated in FIG. 1). In 2401, the determination module 202 detects a communication request from a caller's mobile device that is received at a mobile device of a callee. In 2402, the animation generation module 204 transmits a test animation to the caller's mobile device and generates a display of the test animation in the caller's mobile device. In 2403, the animation generation module 204 detects whether or not the caller has successfully interacted with the test animation (e.g., successfully completed a puzzle included in the test animation). In various embodiments described above, the caller's interaction with the test animation may be transmitted back to the callee's mobile device for viewing in real-time by the callee. In 2404, the animation generation module 204 generates a display of a Robo call report (e.g., an animation) in the caller's mobile device, where such report or animation indicates whether or not the caller has successfully interacted with the test animation.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 25:
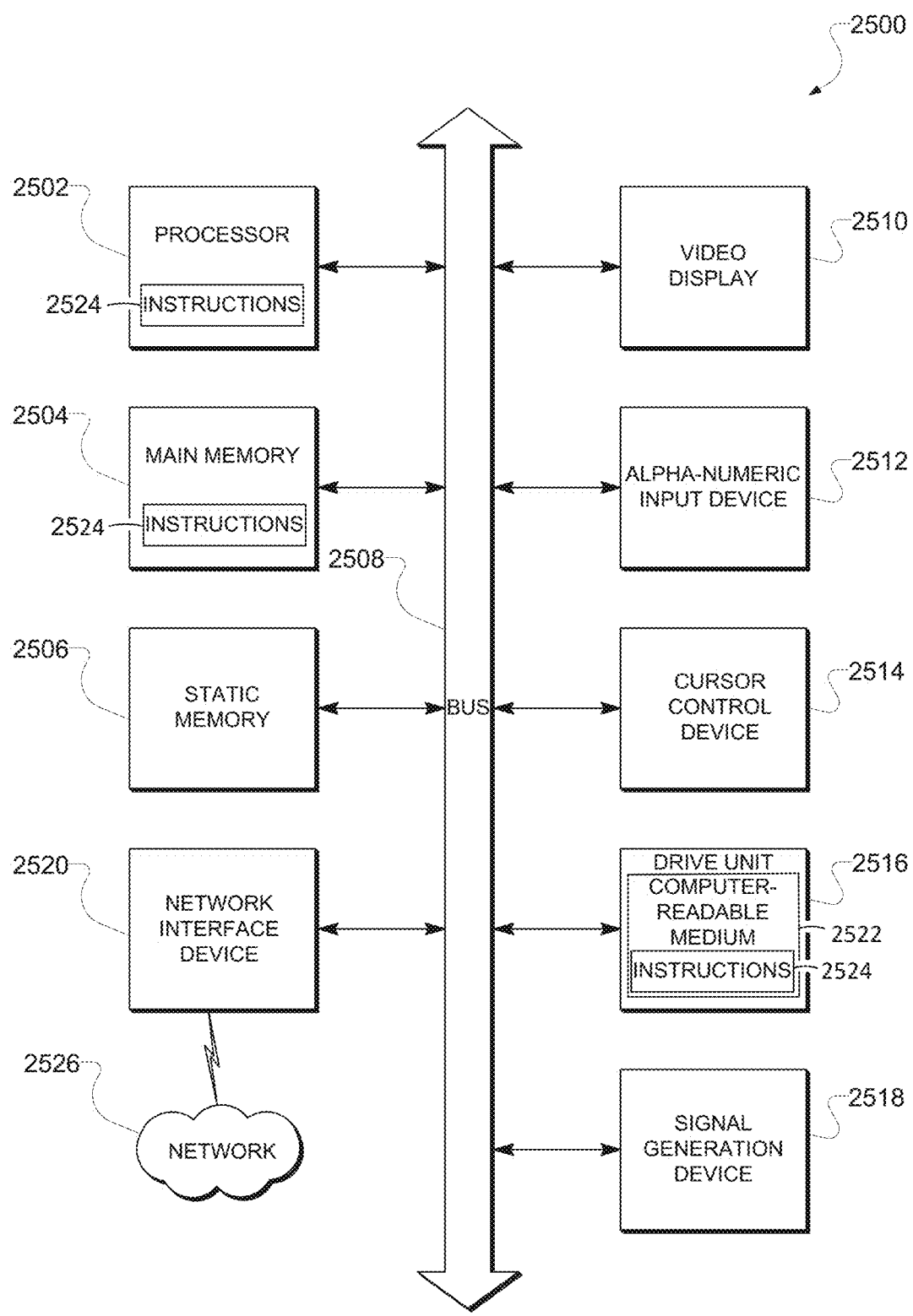
FIG. 25 is a diagrammatic representation of a machine in the example form of a computer system within which a set of instructions, for causing the machine to perform any one or more of the methodologies discussed herein, may be executed.

FIG. 25 is a block diagram of machine in the example form of a computer system 2500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2500 includes a processor 2502 (e.g., a central processing unit (CPU), a graphics processing unit (GPU) or both), a main memory 2504 and a static memory 2506, which communicate with each other via a bus 2508. The computer system 2500 may further include a video display unit 2510 (e.g., a liquid crystal display (LCD) or a cathode ray tube (CRT)). The computer system 2500 also includes an alphanumeric input device 2512 (e.g., a keyboard or a touch-sensitive display screen), a user interface (UI) navigation device 2514 (e.g., a mouse), a disk drive unit 2516, a signal generation device 2518 (e.g., a speaker) and a network interface device 2520.

Machine-Readable Medium

The disk drive unit 2516 includes a machine-readable medium 2522 on which is stored one or more sets of instructions and data structures (e.g., software) 2524 embodying or utilized by any one or more of the methodologies or functions described herein. The instructions 2524 may also reside, completely or at least partially, within the main memory 2504 and/or within the processor 2502 during execution thereof by the computer system 2500, the main memory 2504 and the processor 2502 also constituting machine-readable media.

While the machine-readable medium 2522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 2524 may further be transmitted or received over a communications network 2526 using a transmission medium. The instructions 2524 may be transmitted using the network interface device 2520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   one or more computer processors;
   one or more computer memories;
   a set of instructions stored in the one or more computer memories, the set of instructions configuring the one or more computer processors to perform operations for supplementing a notification of an inbound communication with information pertaining to a nature of the inbound communication, the operations comprising:
   receiving the notification at a device of a callee;
   receiving, at the device, a selection to change an insertion point specified by a relationship animation template;
   determining a relationship between a caller and the callee, a location of the caller, and a location of the callee;
   determining that a distance between the location of the caller and the location of the callee is less than a predetermined threshold;
   and, in response to the distance being less than the predetermined threshold, presenting the notification in a user interface at the device of the callee, the presenting including depicting an identifier associated with the caller, depicting in a map of the user interface the location of the caller, depicting in the map the location of the callee, and depicting a relationship animation according to the changed insertion position.

2. The system of claim 1, wherein determining the relationship includes identifying a type of the relationship between the caller and the callee and depicting the type of the relationship.

3. The system of claim 2, wherein the type of the relationship is one of a plurality of types of relationships defined in rule information stored in a database, the plurality of types of relationships including at least one of romantic relationships, business relationships, friend relationships, and family relationships.

4. The system of claim 3, wherein the rule information associates a graphic with the type of the relationship for the depicting of the type of the relationship.

5. The system of claim 2, wherein the identifying of the type of the relationship is based on directory information stored in the device of the callee.

6. The system of claim 1, wherein depicting the relationship animation includes depicting the location of the caller relative to the location of the callee.

7. The system of claim 1, wherein depicting the relationship animation includes depicting an activity likely being performed by the caller at the location of the caller.

8. A method comprising;
   performing operations for supplementing a notification of an inbound communication with information pertaining to a nature of the inbound communication, the operations comprising:
   receiving the notification at a device of a callee;
   receiving, at the device, a selection to change an insertion point specified by a relationship animation template;
   determining a relationship between a caller and the callee, a location of the caller, and a location of the callee;
   and presenting the notification in a user interface at the device of the callee, the presenting including depicting an identifier associated with the caller, depicting in a map of the user interface the location of the caller, depicting in the map the location of the callee, and depicting a relationship animation according to the changed insertion position.

9. The method of claim 8, wherein determining the relationship includes identifying a type of the relationship between the caller and the callee and depicting the type of the relationship.

10. The method of claim 9, wherein the type of the relationship is one of a plurality of types of relationships defined in rule information stored in a database, the plurality of types of relationships including at least one of romantic relationships, business relationships, friend relationships, and family relationships.

11. The method of claim 10, wherein the rule information associates a graphic with the type of the relationship for the depicting of the type of the relationship.

12. The method of claim 9, wherein the identifying of the type of the relationship is based on directory information stored in the device of the callee.

13. The method of claim 8, wherein depicting the relationship animation includes depicting the location of the caller relative to the location of the callee.

14. The method of claim 8, wherein depicting the relationship animation includes depicting an activity likely being performed by the caller at the location of the caller.

15. A non-transitory machine-readable medium storing a set of instructions, the set of instructions executable by one or more computer processors for performing operations for supplementing a notification of an inbound communication with information pertaining to a nature of the inbound communication, the operations comprising:
   receiving the notification at a device of a callee;
   receiving, at the device, a selection to change an insertion point specified by a relationship animation template;
   determining a relationship between a caller and the callee, a location of the caller, and a location of the callee;
   and presenting the notification in a user interface at the device of the callee, the presenting including depicting an identifier associated with the caller, depicting in a map of the user interface the location of the caller, depicting in the map the location of the callee, and depicting a relationship animation according to the changed insertion position.

16. The non-transitory machine-readable medium of claim 15, wherein determining the relationship includes identifying a type of the relationship between the caller and the callee and depicting the type of the relationship.

17. The non-transitory machine-readable medium of claim 15, wherein the type of the relationship is one of a plurality of types of relationships defined in rule information stored in a database, the plurality of types of relationships including at least one of romantic relationships, business relationships, friend relationships, and family relationships.

18. The non-transitory machine-readable medium of claim 17, wherein the rule information associates a graphic with the type of the relationship for the depicting of the type of the relationship.

19. The non-transitory machine-readable medium of claim 17, wherein the identifying of the type of the relationship is based on directory information stored in the device of the callee.

20. The non-transitory machine-readable medium of claim 15, wherein depicting the relationship animation includes depicting the location of the caller relative to the location of the callee.

* * * * *